United States Patent [19]
Ishikawa et al.

[11] Patent Number: 5,605,733
[45] Date of Patent: Feb. 25, 1997

[54] MAGNETIC RECORDING MEDIUM, METHOD FOR ITS PRODUCTION, AND SYSTEM FOR ITS USE

[75] Inventors: Akira Ishikawa, Kodaira; Sadao Hishiyama, Sayama; Tomoo Yamamoto; Yoshihiro Shiroishi, both of Hachioji; Tomoyuki Ohno, Odawara; Yotsuo Yahisa; Yukio Kato, both of Kokubunji, all of Japan

[73] Assignee: Hitachi, Ltd., Tokyo, Japan

[21] Appl. No.: 7,969

[22] Filed: Jan. 22, 1993

[30] Foreign Application Priority Data

Jan. 22, 1992 [JP] Japan ................................ 4-009011
Jan. 28, 1992 [JP] Japan ................................ 4-012810
Mar. 19, 1992 [JP] Japan ................................ 4-063057

[51] Int. Cl.$^6$ .................................................. G11B 5/66
[52] U.S. Cl. .................. 428/65.3; 428/141; 428/336; 428/694 T; 428/694 TS; 428/694 TB; 428/694 TP; 428/694 TC; 428/694 TR; 428/694 TM; 428/900; 427/127; 427/128; 427/129; 427/130; 427/131
[58] Field of Search .................. 428/694 T, 694 TS, 428/694 TB, 694 TP, 694 TC, 694 TR, 694 TM, 141, 336, 65.3, 900; 427/127, 128, 129, 130, 131

[56] References Cited

U.S. PATENT DOCUMENTS

| | | | |
|---|---|---|---|
| 4,326,229 | 4/1982 | Yanagisawa | 360/135 |
| 4,506,000 | 3/1985 | Kubota et al. | 430/39 |
| 4,652,479 | 3/1987 | Suzuki et al. | 428/65.3 |
| 4,698,251 | 10/1987 | Fukuda et al. | 428/65.7 |
| 4,735,840 | 4/1988 | Hedgcoth | 428/65.5 |
| 4,775,576 | 10/1988 | Bouchand et al. | 428/216 |
| 5,326,607 | 7/1994 | Muramatsu et al. | 428/65.3 |

FOREIGN PATENT DOCUMENTS

| | | |
|---|---|---|
| 61-29418 | 2/1986 | Japan . |
| 62-146434 | 6/1987 | Japan . |
| 62-257618 | 11/1987 | Japan . |
| 63-121123 | 5/1988 | Japan . |
| 63-146219 | 6/1988 | Japan . |
| 63-197018 | 8/1988 | Japan . |
| 1-162229 | 6/1989 | Japan . |
| 1-173313 | 7/1989 | Japan . |
| 1-217723 | 8/1989 | Japan . |
| 1-220217 | 9/1989 | Japan . |
| 1-273218 | 11/1989 | Japan . |
| 2-281414 | 11/1990 | Japan . |

Primary Examiner—Leszek Kiliman
Attorney, Agent, or Firm—Fay, Sharpe, Beall, Fagan, Minnich & McKee

[57] ABSTRACT

A thin-film magnetic recording medium improves the magnetostatic and dynamic magnetic characteristics of the conventional magnetic recording media. In one embodiment, the substrate surface is textured in both the circumferential and radial directions. In further embodiments, a variety of underlayers (13) and crystal orientation control layers (17) are provided in accordance with specific parameters to control the crystal structure of the magnetic layer (14). Finally, an embodiment includes multiple magnetic layers (14, 19) having respectively different residual magnetic flux densities and thicknesses, but similar dot products of residual magnetic flux density and thickness.

28 Claims, 10 Drawing Sheets

MAGNETIC RECORDING MEDIUM, METHOD FOR ITS PRODUCTION, AND SYSTEM FOR ITS USE

BACKGROUND OF THE INVENTION

1. Field of the Invention

The present invention relates generally to recording and reproducing information using a magnetic medium, and more particularly, to a magnetic recording medium constructed so that its various layers have particular constructions; a method for producing such a magnetic recording medium; and a recording system incorporating such a magnetic recording medium.

2. Description of the Related Art

Accompanying the trend towards smaller sizes and higher operating speeds in modern electronic computers, the increased capacity and access speed of magnetic disk devices and other external storage units has been in strong demand. In particular, high-density and high-speed magnetic disk recording devices have been more strongly demanded than ever before.

Known magnetic recording media useful in magnetic disk devices can be divided into recording media of the coated type, obtained by coating a disk substrate with a powder of a magnetic material oxide, and recording media of the thin-film type obtained by depositing a thin film of a magnetic metal onto the substrate. The recording media of the thin-film type generally have a higher density of magnetic material in the recording layer than those of the coated-type, and are hence more suited for high-density recording.

A Co-based alloy having a large magneto-crystalline anisotropy has chiefly been used as the magnetic material for the thin-film type recording medium. The Co-based alloy has a crystal structure of the hexagonal close-packed type (hereinafter HCP), has a direction of easy magnetization which is in parallel with the c axis of the HCP structure, and has a large coercivity $H_c$, a remanence (residual magnetic flux density) $B_r$, and a squareness S, S* in the same direction.

Currently, the direction of easy magnetization is substantially parallel with the surface of the disk. In forming the medium, therefore, the magnetic layer crystals must be so grown that the c axis of the Co-based alloy is nearly parallel with the disk surface.

Conventionally, a Cr layer or a Cr-alloy layer has been employed as an underlayer of the magnetic layer. Such an underlayer conventionally has a body-centered cubic structure (hereinafter BCC). The crystal orientation of the underlayer greatly affects the crystal orientation of the magnetic layer.

For instance, Japanese Patent Laid-Open No. 1-220217 discloses a magnetic recording medium in which the (110) crystal lattice plane of the Co-based alloy and the c axis are formed in parallel with the surface of the substrate on a Cr underlayer of 5 nm to 20 nm thickness, and of which the (100) crystal lattice plane is in parallel with the surface of the substrate.

Japanese Patent Laid-Open No. 63-197018 discloses that, when Ti or Si is added to the Cr underlayer, the crystal orientation of Cr becomes isotropic on the surface of the disk, and modulation of output waveform decreases. Furthermore, Japanese Patent Laid-Open No. 62-257618 discloses that the addition of V or Fe to Cr increases the lattice constant, and matching is improved between the (100) plane of Cr and the (110) plane of the Co-based alloy of the magnetic layer, enabling the coercivity and squareness to be increased.

Conventionally, a variety of underlayers have been employed to improve magnetostatic parameters such as the coercivity and squareness, without, however, paying much attention to such read/write dynamic magnetic parameters as noise, read output and resolution. Moreover, the conventional thin-film type recording media are incapable of producing a sufficiently large resolution and signal-to-noise (S/N) ratio for writing and reading, particularly for data read and written using a magnetoresistive (MR) head featuring high read sensitivity, as in the known inductive write/MR read thin-film magnetic head.

Therefore, the art strongly demands a medium having excellent dynamic properties in order to further improve performance of the magnetic disk device.

Further, conventional magnetic recording media have employed aluminum alloy, glass, organic resin, ceramic or similar materials as the disk substrate for the thin-film type recording media. To improve the surface hardness of the substrate and its magnetic characteristics, an anodic oxide film, or an Ni—P layer, have been formed on the disk substrate surface to a thickness of about 15 μm by a plating method.

On the surface of such a plated substrate, fine grooves have been formed substantially in the circumferential direction, as described in, for example, Hedgcoth, U.S. Pat. No. 4,735,840, and in Japanese Patent Laid-Open Nos. 61-29418, 62-146434 and 63-121123. Such fine grooves are usually called "texture" and are formed by polishing the surface of the disk in nearly the circumferential direction by using abrasive grains having grain diameters of 1 to several microns.

Texture decreases the effective contact area between the magnetic head and the medium when revolution is stopped, and thus decreases the coefficient of friction between the head and the medium. Depending upon the shape and the size of the texture, furthermore, sticking of the head to the recording medium at the start of disk rotation is suppressed.

Additionally, the deposition conditions, such as heating temperature and method of transport within the deposition chamber, can cause nonuniformity of the magnetic anisotropy in the generally circumferential direction, and a consequent change in read output. By optimizing the texture size, underlayer composition and magnetic layer composition, as well as the deposition conditions, the magnetic anisotropy can be made uniform in the generally circumferential direction by applying texture. Moreover, magnetic fluctuation, or modulation, in the read/write output can be suppressed.

Thus, the aforementioned conventional texture is effective for improving wear resistance and read/write characteristics of the thin-film type recording media. However, its beneficial effects greatly vary depending upon the microscopic contours of the texture surface. To form a medium having uniform magnetic characteristics, therefore, the microscopic shape of the texture must be made uniform. However, as mentioned, the conventional texture has been formed by using abrasive grains having grain diameters of 1 to several microns, and thus it has been difficult to uniformly control fine surface ruggedness or pitch, maintaining a size of smaller than 1 μm. Therefore, the coefficient of friction between the head and the medium at the start of disk rotation, and the read/write characteristics, undergo a change from disk to disk and from lot to lot.

Additionally, to carry out even higher density reading and writing, the recording track width must be decreased below that of the currently-employed track width. In this case, however, nonuniformity in the shape of the texture in the radial direction of the disk can further seriously affect read and write signals. In particular, when uniformity of read/write characteristics in the radial direction are strictly required, such as in the case of positioning servo signals, conventional texture cannot be employed.

The gap between the magnetic head and the recording medium and the magnetic field profile of the medium are two additional parameters that must be optimized to increase recording density. However, conventional texture has resulted in increased contact between the magnetic head and the recording medium, due to fine protrusions that are unavoidably formed on the disk substrate surface by the texturing. One prior art approach to solving this problem has been to polish the protrusions from the substrate surface (see Japanese Patent Laid-Open No. 1-162229). Alternatively, the conditions for forming the texture can be controlled so that the ruggedness in the texture is small. In this case, however, the contact area increases between the magnetic head and the medium, leading to the inevitable sticking of the head during the beginning of disk rotation.

Japanese Patent Laid-Open No. 1-273218 teaches a method of decreasing the dynamic coefficient of friction by forming intersecting textures in the circumferential direction. However, the magnetic characteristics of the resulting magnetic layer are not sufficiently improved compared with those of the media having the customary texture, and modulation is likewise not sufficiently suppressed.

Further, to improve the signal-to-noise (S/N) ratio for writing and reading at high linear recording density, the magnetic layer of the medium may be formed as separate thinner magnetic layers using non-magnetic intermediate layers formed between each thinner magnetic layer. Japanese Patent Laid-Open Nos. 63-146219, 1-173313, 1-217723, and 2-281414 teach such multilayered media, which show a better performance in read and write. The media noise is remarkably reduced because of the reduction of each magnetic layer thickness, giving an increase in the S/N ratio. However, the read output at a high linear recording density tends to decrease, resulting in a decrease in the resolution. Thus, the conventional multilayered media still leave a strong demand for increased S/N ratio at a high linear recording density.

SUMMARY OF THE INVENTION

In an effort to resolve the various deficiencies of the prior art, the present invention provides a magnetic recording medium having excellent magnetic recording properties, and which enables high-density recording. The invention further provides a method of producing such a medium, and a magnetic recording system utilizing such a medium, which has a large capacity and high reliability.

The thin-film type magnetic recording medium constructed according to the teachings of the present invention utilizes a disk substrate having texture formed on the substrate surface (or surfaces, for a double-sided disk) in both the circumferential and radial directions. The circumferential and radial textures are formed in a mixed manner on the surface of the disk substrate by polishing in the circumferential direction and in the radial direction, using, preferably, a common polishing device. Moreover, the circumferential and radial texturing is performed so that preceding texturing steps are not overcome by subsequent texturing steps.

The circumferential texture is formed by rotating the disk at high speed while pressing a polishing tape, buff or similar device onto one or both sides of the disk in the presence of a polishing agent known to the art. Concurrently with the circumferential texture thus formed, the polishing lead is vibrated in the radial direction of the disk while the disk rotates, so that the direction of texture changes between substantially the circumferential direction and a mixed circumferential-radial texture.

In accordance with specific embodiments of the invention, the form of the texture can be varied by changing the amplitude, frequency or both of the radial vibration, and by changing the rotational speed of the disk.

In another embodiment of the present invention, over the (textured or untextured) surface, an underlayer having a crystal structure of the BCC type, and further containing crystal grains whose (100) lattice plane is nearly in parallel with the substrate, and crystal grains whose (110) lattice plane is nearly in parallel with the substrate, in a mixed manner, is provided over the substrate. The ratio of underlayer areas occupied by the crystal grains of the (100) lattice plane, and crystal grains of the (110) lattice plane, can be expressed as a ratio of X-ray diffraction peak intensities of the (100) lattice plane and the (110) lattice plane, although the (200) lattice plane X-ray diffraction peak intensity is measured as an indication of the (100) lattice plane X-ray diffraction peak intensity.

Denoting the respective X-ray diffraction peaks of the (200) lattice plane and the (110) lattice plane as $I_{200}$ and $I_{110}$, respectively, a medium having a high recording density, high S/N ratio, and high half-output recording density D50 can be produced by selecting the underlayer materials and controlling its deposition conditions so that the value $I_{200}/I_{110}$ falls within a predetermined range, preferably 0.2 to 20. To further improve the magnetic characteristics of the medium, the ratio $I_{200}/I_{110}$ should fall between 0.5 and 10.

Among the inventive methods of controlling the $I_{200}/I_{110}$ ratio are the optimization of oxygen concentration in the underlayer, optimization of the underlayer thickness, addition of one or more specific elements to the chief component of the underlayer, controlled concentration of such added elements, and addition of an intermediate layer between the substrate and underlayer.

In another embodiment, the present invention contemplates improvement in the magnetic characteristics of the recording medium by controlling the ratio L/P, wherein L represents the concentration of crystal grains whose c axes are substantially parallel to the substrate and P represents the concentration of crystal grains whose c axes are nearly perpendicular to the substrate in the magnetic layer. In a particular embodiment, the ratio L/P is controlled to be between 1 and 20. In particular embodiments described below, the crystal grains whose c axes are substantially parallel to the substrate have the (100), (101) and (110) planes parallel to the substrate, and the crystal grains whose c axes are nearly perpendicular to the substrate have the (001) plane parallel to the substrate.

The invention contemplates that the L/P ratio is set to a desired value by optimizing the structure of the underlayer, and by epitaxially growing a magnetic layer on the underlayer. Three methods have proven to be effective.

According to the first method, the underlayer is chiefly formed of at least one element selected from a group consisting of Cr, Mo, W, V, Nb and Ta, for example, to cover less than the entire surface area of the substrate, so that the exposed portion of the substrate surface corresponds to 1% to 30% of the unexposed portion (or the underlayer). In a particular embodiment, the crystal grains of the underlayer are separated from each other by more than 1 nm but less than 50 nm to maintain high-density writing and reading.

Additionally, the formation of the underlayer can be optimized by optimizing the gas (preferably argon) pressure, substrate temperature, layer thickness and deposition rate. In particular, the layer thickness is preferably greater than 0.5 nm but less than 50 nm.

According to the second method, at least one element selected from a group consisting of Ti, Zr, Sc, Y, Hf, Rh, Os, Zn, Cd, La, Ce, Pr, Nd, Ir, Pt, Au, Pd, Ag, Cu, Tl, Si, Ge, Sn, Pb and P is added to the underlayer at a concentration of greater than 1 at % but smaller than 30 at %. Further, the element or elements selected from this group are segregated in the crystal grains and/or on the grain boundaries.

According to the third method, a crystal orientation control layer is formed on the substrate, between the substrate and the underlayer. Preferably, the crystal orientation control layer is formed of at least one element selected from the same group from which one or more elements was added to the underlayer. Then, the underlayer is formed from the chief group so as to cover less than the entire crystal orientation control layer, leaving an exposed portion of the crystal orientation control layer having an area of greater than 1% but smaller than 30% of the unexposed portion (i.e., the surface area of the underlayer).

In another embodiment of the present invention, at least two magnetic layers are formed on one side of a disk substrate, where the magnetic layers are not identical, but instead have a different remanence $B_r$ and thickness $\delta$ for each magnetic layer, while maintaining an equivalent $B_r \cdot \delta$ for each layer. Those magnetic layers are preferably separated by a non-magnetic intermediate layer which has a thickness in the range of 1 nm to 20 nm.

The $B_r$ can be varied for the each magnetic layer by changing at least the composition of the magnetic layers, the crystallite structure in the film, or the crystallite orientation. The crystallite structure and orientation can be controlled by the gas pressure, the concentration of the impurity in the deposition chamber such as water or oxygen, and the deposition rate of the magnetic film.

The $B_r$ for each magnetic layer is preferably controlled so that the magnetic film near the plane which is facing the magnetic head has a higher $B_r$ than the magnetic film which is far from that plane when an inductive head is utilized for read and write. On the other hand, the $B_r$ for each magnetic layer is preferably controlled so that the magnetic film near the plane which is facing the magnetic head has a lower $B_r$ than the magnetic film which is far from that plane when a magnetoresistive (MR) head is utilized for read and write.

DETAILED DESCRIPTION OF THE PREFERRED EMBODIMENTS

Figure 1:
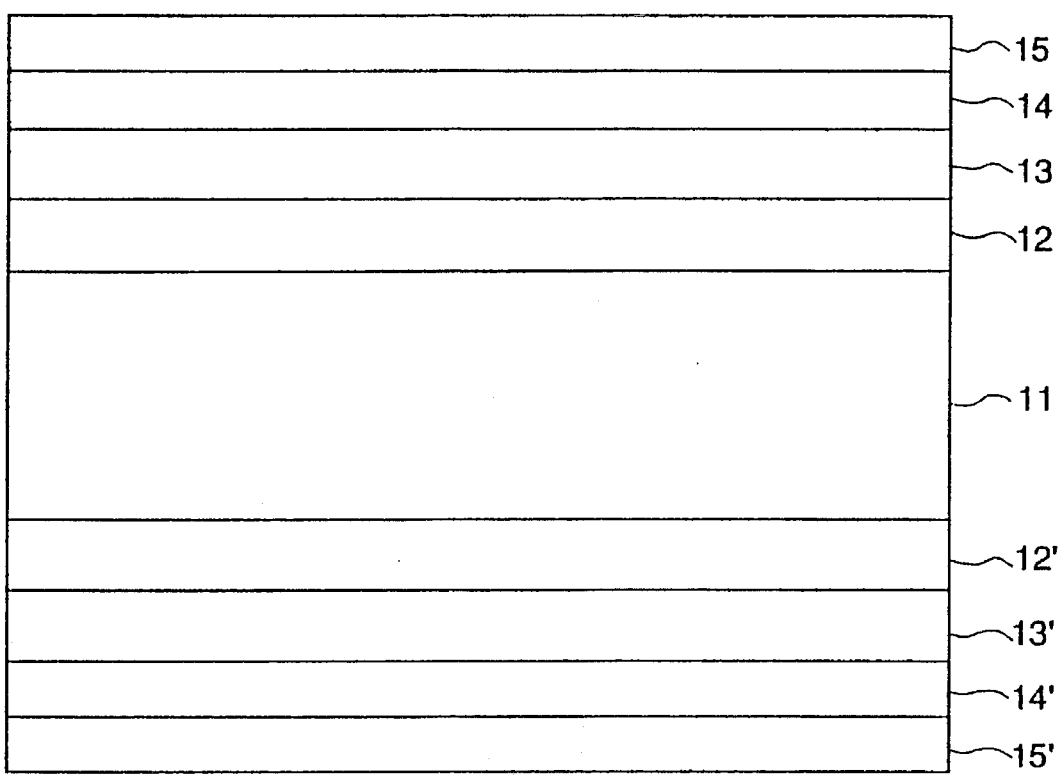
FIG. 1 shows a cross-sectional view of a magnetic recording medium illustrating the teachings of the present invention.

FIG. 1 schematically illustrates in cross-section the structure of a thin-film-type magnetic recording medium constructed according to the teachings of the present invention. For the purposes of this description, reference will be made to one side of the illustrated double-sided disk. Corresponding layers of the second (undescribed) side, shown in the figures and denoted by a prime ('), are constructed of the same materials and in the same manner as their unprimed counterparts.

Reference numeral 11 denotes a disk substrate preferably comprising an Al—Mg alloy, a chemically strengthened glass, an organic resin, or a ceramic, for example. Reference numeral 12 denotes the nonmagnetic plated layer, which may be of Ni—P, Ni—W—P, Ni—V or the like. When the Al—Mg alloy is used as the substrate of a double-sided magnetic disk, the above plated layers are usually formed.

Reference numeral 13 denotes a metal, nonmagnetic underlayer formed on the electroplated layer 12. Reference numeral 14 denotes a metal magnetic layer that is formed on the underlayer, and 15 denotes a nonmagnetic protecting layer that is preferably formed on the above magnetic layers. A final lubricant coating (not shown) of, for example, perfluoroalkylpolyether may be formed on the protecting layer 15 to a thickness of about 1 to 20 nm.

The magnetic layer 14 preferably comprises Co, Fe or Ni as a chief component, optionally with at least one of the following elements to form an alloy to help improve read/write characteristics and corrosion resistance of the recording medium: Cr, Mo, W, Zr, Ta, Nb, Al, Si and Pt, and is formed to a thickness of about 10 to 100 nm. More particularly, magnetic layer 14 may be composed of Co-Ni, Co-Cr, Co-Re, Co—Pt, Co—P, Co—Fe, Co—Ni—Zr, Co—Cr—Al, Co—Cr—Ta, Co—Cr—Pt, Co—Ni—Cr, Co—Cr—Nb, Co—Ni—P, Co—Ni—Pt, Co—Cr—Si or the like.

In particular, favorable characteristics have been recognized when the magnetic material of the magnetic layer 14 is Co—Ni, Co—Cr, Co—Fe, Co—Mo, Co—W, Co—Pt, Co—Re or the like.

Furthermore, for particularly favorable corrosion resistance and magnetic characteristics, an alloy chiefly comprising Co—Ni—Zr, Co—Cr—Pt, Co—Cr—Ta or Co—Ni—Cr may be employed. Wear resistance and corrosion resistance can be improved when the protecting layer 15 employs a carbide such as W—C, Si—C, W—Zr—C or W—Mo—C, a nitride such as Zr—Nb—N or $Si_3N_4$, an oxide such as $SiO_2$ or $ZrO_2$, or B, C, $B_4C$, $MoS_2$ or Rh as a protective film.

Figure 2:
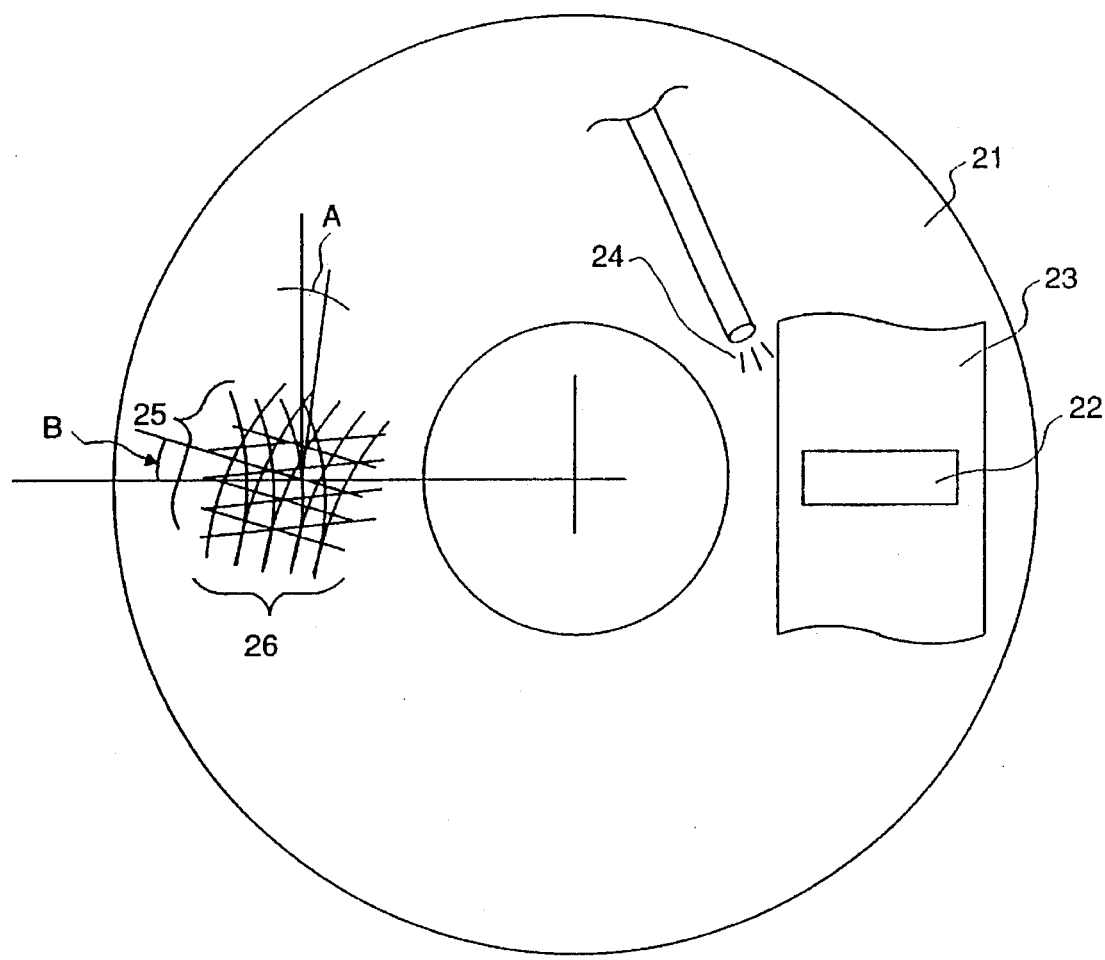
FIG. 2 schematically illustrates an apparatus and method for texturing the substrate of the magnetic recording medium.

In a specific embodiment of the invention, the substrate 11 (plated or not) is textured both in the circumferential and radial directions, in a mixed manner through the textured surface, as schematically illustrated in FIG. 2. The texture in the circumferential direction (defined as having an angle less than about ±45° between the texture and a straight line perpendicular to a radial straight line connecting a point of the texture and the center of the disk), or nearly the circumferential direction, is preferably formed by rotating the disk at high speed while pressing a polishing tape, buff, or similar texturing means to both sides of the disk (for a double-sided disk) in the presence of a polishing agent. Radial-direction texturing (defined as having an angle of less than about ±45° between the texture and the radial straight line) can be applied by vibrating the polishing tape in the radial direction so that the direction of the texture changes from the circumferential direction toward the radial direction.

For a low-speed vibration, e.g., slower than the rotational peripheral speed of the disk, the texture remains mainly in the circumferential direction. The direction of the texture, however, can attain a greater radial component by increasing the amplitude and/or frequency of the radial vibration. Additionally, the form of the texture can be varied by changing these parameters.

In a preferred embodiment, the size of the ruggedness, or roughness, of the texture in the circumferential direction is smaller than that of the texture in the radial direction, to improve the read/write characteristics of the recording medium, and to decrease the modulation of a read output.

According to the present invention, important factors in designing the circumferential and radial texture are the average roughness factor $R_a$ and maximum height $R_{max}$, which express the size of the ruggedness of the texture. To obtain good results in regard to the variation in the read/write characteristics, taking into consideration the head spacing and initial friction between the head and the recording medium when disk rotation begins, $R_a$ preferably lies within a range of 0.5 nm to 10 nm, and $R_{max}$ preferably lies within a range of 5 nm to 100 nm. For a small head spacing, for example 0.15 μm or smaller (required for high-density recording), the recording medium requires a particularly high wear resistance. Then, the value $R_a$ preferably ranges from 0.5 nm to 5 nm, and $R_{max}$ from 5 nm to 50 nm.

For the purpose of this description, "average roughness factor" and "maximum height" should be construed in accordance with the definitions stipulated under the Japanese Industrial Standards (JIS-B0601).

As noted, FIG. 2 schematically illustrates the formation of the circumferential and radial texturing described above. As shown, circumferential texturing 26 and radial texturing 25 are formed by rotating disk substrate 21 while contacting the substrate 21 with polishing tape 23 in a tape polishing machine, for example. Contact roll 22 contains a polishing agent 24 for actually contacting disk substrate 21.

The following examples will more fully illustrate the present embodiment.

EXAMPLE 1

The disk substrate was coated with an plated layer 12 composed of Ni—12P to a thickness of 13 μm on the disk substrate 11. In this example, the disk substrate had an outer diameter of 130 mm, an inner diameter of 40 mm, a thickness of 1.9 mm, and was composed of Al-4Mg.

The surface of the substrate was smoothly polished using a lapping machine until the average roughness factor $R_a$ was less than 5 nm, followed by washing and drying.

Then, by using a tape polishing machine as shown in FIG. 2, polishing tape 23 was pressed onto both sides of the disk through contact roll 22 while rotating the disk substrate 21. Polishing tape 23 was vibrated in the radial direction of the disk in the presence of a polishing agent 24, to form a texture on the surface of the substrate in both the circumferential and radial directions. Then, the polishing tape was pressed onto both sides of the disk through the contact rolls in the presence of the polishing agent while rotating the disk substrate, absent vibration in the radial direction, to form texture 26 on the substrate in the circumferential direction only, but in a manner so that the radial texture was not erased.

Finally, the polishing agent and the like adhering to the substrate due to the texturing was removed by washing, followed by drying.

The surface roughness of the substrate was determined by using a needle touch-type surface profiler, a scanning tunneling microscope, or an electron ray three-dimensional roughness measuring instrument. The fine texture structure on the substrate surfaces was further observed by using a scanning electron microscope, a scanning tunneling microscope or an electron ray three-dimensional roughness measuring instrument, and textures in both the circumferential and radial directions were confirmed to exist in a mixed manner.

As a comparative example, a disk substrate was prepared having only circumferential texturing. The values for $R_a$ and $R_{max}$ for the radial direction were selected to be the same as for the experimental disk.

Then, both the subject substrate and the comparative substrate were put into a magnetron sputtering apparatus, and Cr underlayers were formed on each substrate to a thickness of 50 nm at 200° C. and an argon pressure of 5 mtorr. Magnetic layers 14 composed of Co—12Cr—4Ta were formed on the underlayers to a thickness of 40 nm. Finally, carbon protecting layers 15 were formed to a thickness of 20 nm on magnetic layers 14, and adsorptive lubricating layers of perfluoroalkylpolyether or the like were formed on the carbon protective layers.

The write/read characteristics of the thus-prepared media were measured using a thin-film magnetic head having an effective gap length of 0.4 μm and a track width of 10 μm at a relative speed of 12 m/sec and a head spacing of 0.1 μm, to find the modulation Md, half-output recording density $D_{50}$ and S/N ratio of the respective media. The modulation Md is defined by the relation Md=(H–L)/(H+L), where H denotes a maximum output and L denotes a minimum output. Furthermore, a maximum value (μ) of the dynamic coefficient of friction was measured using a magnetic head material of $Al_2O_3$ TiC under a weight of 10 fg and at a relative speed of 0.5 m/sec. Further, the write/read error bit numbers per unit area of each recording surface were measured immediately after fabrication, and after 50,000 contact start/stop operations (CSS) to measure the increase in the number of error bits before and after CSS.

Table 1 shows measured maximum values ([f) of the dynamic coefficient of friction, the increase in the number of errors before and after CSS, and modulation Md of the media for the subject and comparative recording disks prepared having the described substrate texturing, for various values of $R_a$ and $R_{max}$ measured for the radial direction.

TABLE 1

| Ra (nm) | Rmax (nm) | Dynamic coefficient of friction μf | | Increase in the number of error bits after CSS (bits/surface) | | Modulation Md % | | Half output recording density D50 (kFCl) | |
|---|---|---|---|---|---|---|---|---|---|
| | | Comparative example | Mixed textures | Comparative example | Mixed textures | Comparative example | Mixed textures | Comparative example | Mixed textures |
| 0.3 | 3 | 1.7 | 1.7 | 68 | 36 | 26 | 13 | 20 | 20 |
| 0.5 | 5 | 1.5 | 0.73 | 58 | 3 | 12 | 7 | 23 | 49 |
| 1.2 | 11 | 1.4 | 0.25 | 43 | .2 | 11 | 6 | 25 | 50 |
| 2.3 | 20 | 1.4 | 0.23 | 35 | 1 | 10 | 5 | 27 | 52 |
| 4.9 | 49 | 0.70 | 0.21 | 20 | 1 | 6 | 3 | 28 | 54 |
| 5.5 | 56 | 0.41 | 0.21 | 13 | 5 | 6 | 3 | 28 | 55 |
| 9.8 | 93 | 0.35 | 0.20 | 14 | 6 | 3 | 3 | 27 | 56 |
| 11 | 102 | 0.33 | 0.20 | 15 | 14 | 3 | 3 | 27 | 57 |
| 13 | 135 | 0.30 | 0.21 | 38 | 25 | 4 | 4 | 27 | 56 |

Table 1 shows that the recording medium prepared according to the teachings of the present invention has a dynamic coefficient of friction, an error measurement before and after CSS, and a modulation during reading and writing which are all smaller than those of the comparative example, even though the $R_a$ and $R_{max}$ values were the same for each medium. In particular, for a small surface roughness, the effects of the mixed textures are notable. Moreover, the medium prepared according to the present invention offered a half-output recording density $D_{50}$ during read and write, and S/N ratio, which were greater than those of the comparative example.

Thus, Table 1 shows that a recording medium of high reliability may have a surface roughness with values $R_a$ between 0.5 nm and 9.8 nm, and $R_{max}$ between 5 nm and 93 nm. For a particularly high reliability, $R_a$ may be between 0.5 nm and 4.9 nm, and $R_{max}$ between 5 nm and 49 nm.

and B determined as average values.

For a comparative example, a disk substrate was prepared having substantially only circumferential texturing. The surface roughness of the comparative disk was controlled to have the same $R_a$ and $R_{max}$ of the subject example.

Both disk substrates were placed in a magnetron sputtering apparatus, with underlayers 13 of Cr-10Ti, magnetic layers 14 of Co-13Cr-4Pt, carbon protecting layers 15 and lubricating layers of perfluoroalkylpolyether or the like formed in the same manner as for Example 1.

Read/write characteristics of the media thus formed are shown in Table 2.

TABLE 2

| Angle in circumferential direction A (deg) | Angle in radial direction B (deg) | Dynamic coefficient of friction μf | | Modulation % | | S/N of medium. | | Half-output recording density D50 (kFCl) | |
|---|---|---|---|---|---|---|---|---|---|
| | | Comparative Example | Mixed textures | Comparative Example | Mixed textures | Comparative Example | Mixed textures | Comparative Example | Mixed textures |
| 0 | 0 | 1.4 | 0.25 | 11 | 3 | 7.3 | 8.5 | 23 | 62 |
| 2 | 0 | 1.4 | 0.23 | 13 | 3 | 7.0 | 8.2 | 23 | 59 |
| 4 | 0 | 1.3 | 0.21 | 16 | 4 | 6.9 | 7.6 | 22 | 58 |
| 9 | 0 | 1.2 | 0.20 | 19 | 4 | 6.7 | 7.5 | 22 | 58 |
| 15 | 0 | 1.1 | 0.19 | 22 | 5 | 6.4 | 7.4 | 22 | 57 |
| 19 | 0 | 1.0 | 0.19 | 24 | 5 | 6.2 | 7.3 | 21 | 57 |
| 32 | 0 | 0.5 | 0.18 | 26 | 18 | 5.8 | 5.9 | 21 | 32 |
| 44 | 0 | 0.4 | 0.18 | 35 | 29 | 4.5 | 4.6 | 20 | 31 |
| 0 | 2 | 1.4 | 0.25 | 11 | 3 | 7.3 | 8.5 | 23 | 63 |
| 0 | 5 | 1.4 | 0.25 | 11 | 3 | 7.3 | 8.5 | 23 | 63 |
| 0 | 8 | 1.4 | 0.25 | 11 | 3 | 7.3 | 8.6 | 24 | 62 |
| 0 | 19 | 1.4 | 0.25 | 11 | 2 | 7.3 | 8.4 | 24 | 62 |
| 0 | 28 | 1.4 | 0.26 | 11 | 2 | 7.3 | 8.3 | 24 | 61 |
| 0 | 44 | 1.4 | 0.27 | 11 | 2 | 7.3 | 7.6 | 23 | 60 |

EXAMPLE 2

Referring to FIG. 2, the disk substrate was prepared according to Example 1, but with the circumferential texture angle A and radial texture angle B varied, while further changing the speed/frequency of vibration of the polishing tape and the rotating speed of the disk substrate. In this case, the surface roughness measured for the radial direction was controlled so that $R_a$ was 1 nm and $R_{max}$ was 9 nm. The substrates were then observed by scanning electron microscope, scanning tunneling microscope or electron ray three-dimensional roughness measuring instrument, with angles A and B determined as average values.

As shown in Table 2, favorable values for the dynamic coefficient of friction, modulation, S/N ratio, and $D_{50}$ were determined for the subject medium compared with the comparative example, when the angle A was varied within a range smaller than 19 degrees. When angle B was varied within a range smaller than 44 degrees, the inventive disk also exhibited favorable values for the dynamic coefficient of friction, modulation and S/N ratio.

Moreover, the number of errors increased by only a relatively small amount before and after CSS, and a large half-output recording density $D_{50}$ was exhibited during reading and writing. Such results were similarly recognized when the value $R_a$ was greater than 0.5 nm but smaller than 10 nm, and the value $R_{max}$ greater than 5 nm but smaller than 100 nm. Particularly favorable results occurred for an $R_a$ between 0.5 nm and 5 nm, and $R_{max}$ between 5 nm and 50 nm.

A magnetic recording system assembled to include a recording medium constructed in accordance with the teachings underlying Examples 1 and 2 below may include a plurality of composite thin-film magnetic heads having a Co—Ta—Zr alloy as a magnetic pole material for recording, and magnetoresistive elements for reading. The magnetic recording system, exemplified by FIG. 3, further includes a magnetic medium drive system 42 for driving medium 41, a magnetic head drive unit at 44 for driving heads 43, and a read/write signal processing system at 45. Such a system exhibits a longer lifetime before error generation for a head spacing of 0.08 μm, when compared with a similar system incorporating a disk constructed according to the conventional teachings. Additionally, high reliability can be shown for the inventive system.

Thus, smaller relative spacing between the various components of the recording system are required, offering an increased phase margin in reading and writing signals, which enables the areal recording density to be doubled compared with that of the prior art. Thus, the magnetic recording system is quite small in size compared to that of the prior art.

The magnetic recording system will achieve similar effects by incorporating an inductive write/MR-read thin-film magnetic head using an NiFe or a CoFe alloy as a magnetic pole material for recording, for a metal-in-gap type inductive write/MR-read composite, magnetic head having a Co—Ta—Zr or an FeAlSi alloy at the gap, or for an inductive thin-film head or an MIG head.

For a recording disk constructed according to the teachings of the present invention, the contact area between the magnetic head and the medium surface can be decreased when a recording or reproduction operation is stopped, compared with that of the conventional medium which has texturing substantially in only the circumferential direction. Accordingly, head sticking is suppressed at the time rotation begins.

It is thus possible to suppress the head sticking even when the texture ruggedness is more fine than that of the conventional ruggedness. Additionally, the sizes of protrusions and burrs that inevitably develop on the medium surface decrease with the decrease in the size of the ruggedness, so that the magnetic head contacts the medium less frequently for decreased spacing. In other words, the reading and writing can be realized with a narrower head spacing than that of the prior art. Accordingly, the read/write characteristics can be improved while maintaining high reliability.

Moreover, in accordance with the present invention, less-abrasive grains having smaller grain sizes than those of the prior art can be employed, enabling the microscopic surface shape to be controlled uniformly. This sharply reduces the variation in read/write characteristics from disk to disk or lot to lot.

In a further embodiment, in order to increase the in-plane coercivity, while providing a large read output, and to optimize these characteristics as well as other advantageous characteristics of the invention, the ratio of the crystal grains whose c axis in the magnetic layer 14 is directed nearly in the in-plane direction, i.e., whose (100) or (110) lattice plane of the hexagonal close-packed (HCP) crystal structure is nearly in parallel with the substrate 11, can be increased.

Protective layer 15 is preferably deposited on the magnetic layer to a thickness of 10 to 50 nm.

With such a medium, however, the demagnetizing field component increases because magnetizations of different directions strongly repel each other in the boundary of the recording bit (i.e., in the magnetization transition region). This results in an increase in the fluctuation of the magnetization. Therefore, the recording medium noise becomes very large at the time of high linear density recording, and the S/N ratio decreases. In particular, when using a magnetoresistive-type read head that otherwise features excellent read sensitive and a high S/N ratio, such medium noise causes the S/N ratio to decrease, negating the excellent characteristics of the head.

On the other hand, arranging the magnetic layer crystal grains of the (101) orientation to have their c axis tilted by about 28 degrees from the surface of the substrate brings decreased fluctuation of magnetization and, hence, very small noise, since the magnetization at the boundary of each recording bit has a nearly perpendicular component due to the tilt of the c axis. Thus, the magnetization repulsion component exists substantially in the direction perpendicular to the substrate, although the read output and the in-plane coercivity component may be slightly reduced from those of the crystal grains of the (100) or (110) orientations.

By taking these points into consideration, a recording medium that produces a large read output with small noise, even for a high-density recording, preferably contains magnetic layer crystal grains of the (100) or (110) orientations whose c axes are directed nearly in the in-plane direction, as well as the crystal grains of the (101) orientation whose c axis is tilted by about 28 degrees from the surface of the substrate 11 at a suitable ratio in a mixed manner.

Accordingly, a primary concern is the control of the various crystal grain orientations for the magnetic layer 14. One effective method, described with reference to FIG. 1, is to control the orientation of the underlayer 13, and epitaxially grow the magnetic layer on the orientation-controlled underlayer.

For example, X-ray diffraction of Cr of the BCC-structured underlayer 13 indicates diffraction peaks attributable to the (110), (200), (211), (220), (310) and (222) lattice planes. On the other hand, according to standard data of JCPDS, when employing Cr powder in which the crystal grains are oriented amorphously, X-ray diffraction peaks attributable to these lattice planes measure 100, 16, 30, 18, 20 and 6 in order of decreasing intensity. For a Cr layer formed by vacuum vaporization or sputtering, however, some lattice planes tend to grow primarily in parallel with the substrate 11 due to interatomic distances and interaction with the substrate. Unlike the powder sample data, therefore, the ratio of diffraction peak intensities of the Cr layer by X-ray, electron ray or neutron ray diffraction varies greatly depending upon the impurities in the layer, thickness of the layer, composition, substrate composition, and deposition conditions.

For example, when a Co-based alloy magnetic layer 14 is formed on a Cr underlayer 13 by sputtering or a similar method, the Co-based alloy magnetic layer grows on the interface thereof, oriented so that deviations in the spatial atomic positions decrease between the crystal lattice of the Co-based alloy and the crystal lattice of the Cr underlayer 13. For instance, the (100), (001) and (101) lattice planes of the Co-based alloy grow on the (110) lattice plane of Cr, and the (110) lattice plane of the Co-based alloy grows on the (100) lattice plane (detected as (200) by X-ray analysis) of Cr. In order to grow the (100) or (110)-plane crystal grains and the (101)-plane crystal grains in the Co-based alloy in a mixed manner, therefore, the (110)-plane crystal grains and the (100)-plane crystal grains must be contained in a mixed manner in the Cr underlayer 13.

In a preferred embodiment, the underlayer 13 shown in FIG. 1 contains at least one element selected from a first group consisting of Cr, Mo, W, V, Nb and Ta, the underlayer having a crystal structure of the body-centered cubic (BCC) type. Further, the crystal structure of the underlayer 13 preferably includes the (100) lattice plane and (110) lattice plane oriented approximately in parallel with the substrate 11 in a mixed manner at a predetermined ratio. The ratio of areas of the underlayer 13 occupied by the crystal grains that have the (100) lattice plane nearly parallel with the substrate 11 and crystal grains that have the (110) lattice plane nearly parallel with the substrate 11 can be expressed as a ratio of X-ray diffraction peak intensities for the respective lattice planes.

However, since the X-ray diffraction peak of the (100) lattice plane cannot be observed, the peak of the (200) lattice plane (which has the same atomic arrangement as the (100) lattice plane) is observed instead. The respective intensities of the X-ray diffraction peaks for the (110) and (200) lattice planes are denoted by $I_{110}$ and $I_{200}$.

To maintain a medium of high recording density having a write and read signal-to-noise (S/N) ratio greater than 25 dB, and a half-output recording density (D50) of 50 kFCI or greater, the underlayer 13 should be grown so that the value $I_{200}/I_{110}$ becomes greater than 0.2, but smaller than 20, preferably. To realize even higher-density writing and reading while maintaining the S/N ratio during write and read greater than 27 dB, and the $D_{50}$ greater than 53 kFCI, furthermore, the crystal orientation of the underlayer 13 is best arranged so that its value $I_{200}/I_{110}$ becomes greater than 0.5 but smaller than 10.

One method for obtaining the desirable $I_{200}/I_{110}$ ratio is to optimize the oxygen concentration in the underlayer 13, which is effective for realizing a desired crystal orientation in the underlayer. That is, to control the crystal orientation of the underlayer 13, and to optimize the value $I_{200}/I_{110}$, the impurity oxygen concentration in the underlayer should be greater than 0.1% by weight, but smaller than 5% by weight. Even more preferably, the oxygen concentration should be smaller than 3% by weight.

An additional method for obtaining the desired crystallinity is to optimize the thickness of the underlayer 13 by suppressing the effect of the portion of the underlayer that initially grows on the substrate. In other words, by limiting the thickness of the underlayer 13 to the range of about 5 nm to about 300 nm, its crystal orientation can be controlled to optimize the value $I_{200}/I_{110}$.

In a further embodiment, an element selected from a second group consisting of Ti, Mn, Co, Si, Ga, Ge, V, Cu and Zn is added to the underlayer 13 at a concentration of greater than 1 at % but less than 30 at % in addition to the material from the first group previously mentioned.

Alternatively, the underlayer 13 may include, in addition to the element or elements selected from the first group, an element selected from a third group consisting of Ru, Rh, Pd, Os, Ir, Pt and Au at a concentration of greater than 0.01 at % but smaller than 5 at %. In either case, the orientation of the underlayer can be favorably controlled to optimize the value $I_{200}/I_{110}$.

In order to realize such a crystal orientation in the underlayer 13, the impurity oxygen concentration in the underlayer may be optimized. Furthermore, the thickness of the layer may be optimized to suppress the deleterious effects of the initial growth of the underlayer 13 on the substrate 11.

In the embodiment where a Co-based alloy is grown on the underlayer 13 as the magnetic layer 14, the (100), (001) or (101) lattice plane of the Co-based alloy grows on the (110) lattice plane of the underlayer. To improve the matching of atomic positions between the (110) lattice plane of the underlayer 13 and the (101) lattice plane of the Co-based alloy, for example, an element selected from the second group of Ti, Mn, Co, Si, Ga, Ge, V, Cu and Zn or from the third group consisting of Ru, Rh, Pd, Os, Ir, Pt and Au is preferably added to the underlayer. The (101) lattice plane of the magnetic layer 14 thus predominantly grows on the (110) lattice plane of the underlayer 13, making possible a large read output while decreasing noise.

The amount of second or third group element to be added depends upon the kind of element that is added. For example, when an element from the second group is added, the chief element of the underlayer 13 must maintain the BCC-type crystal structure. Desirably, then, the element selected from the second group should be added in an amount greater than 1 at % but smaller than 30 at %, and more preferably, greater than 5 at % but smaller than 30 at % to obtain a recording medium capable of high-density recording.

When an element selected from the third group is added, the chief element in the underlayer 13 should also have a BCC-type crystal structure. Such an element should desirably be added in an amount greater than 0.01 at % but smaller than 5 at %.

Figure 4:
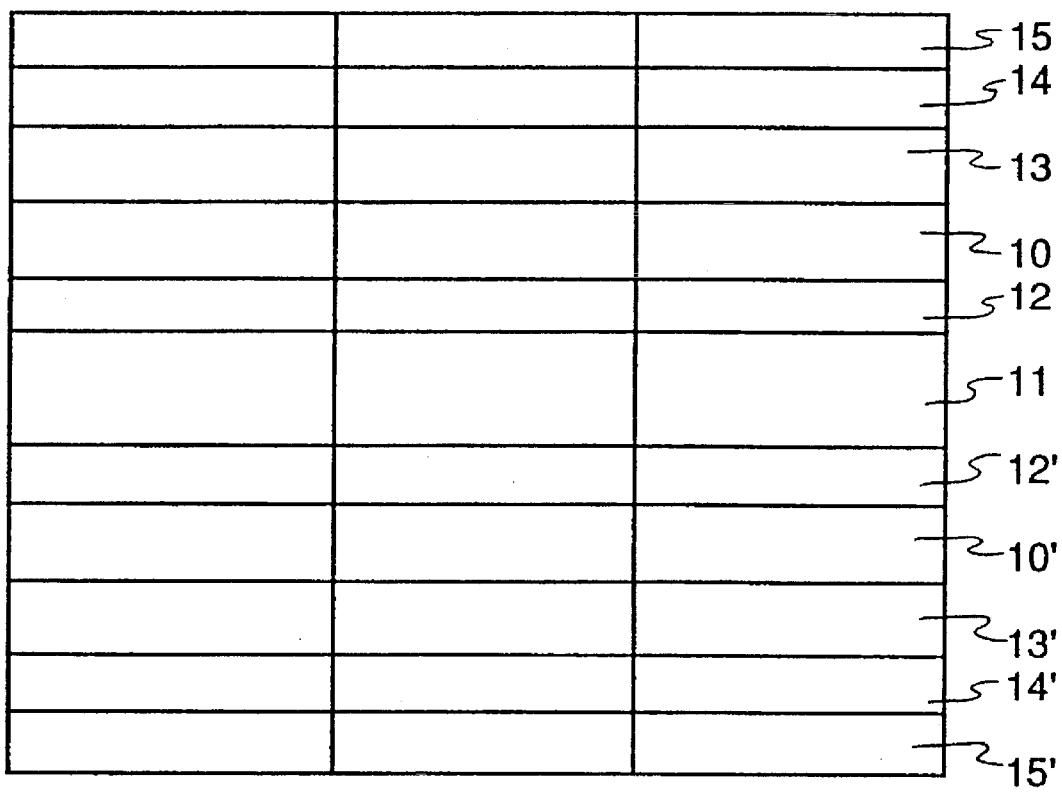
FIG. 4 shows a cross-sectional view of a magnetic recording medium, including an intermediate layer on the substrate, illustrating a further embodiment of the present invention.

Moreover, the underlayer crystal orientation can be favorably controlled, and the value $I_{200}/I_{110}$ optimized, by adding an intermediate layer 10 between the disk substrate 11 (electroplated or nonelectroplated) and the underlayer 13 (see FIG. 4). Preferably, the intermediate layer 10 contains at least one element selected from a fourth group consisting of Ni, Mg, Al, Si, Ti, Zr, Cr, Mn, Cu, Zn, Mo, W, Nb, Ta, Pt, Pz, Rh, Ru, Os, Au and Ir at a concentration of greater than 1 at % but smaller than 99 at %. Further, the intermediate layer 10 is preferably formed to a thickness between 2 nm and 100 nm.

The advantageous effects of the underlayer 13 as previously mentioned have been described with respect to a Cr—based or Cr alloy-based underlayer. However, other alloys that have a body-centered cubic lattice structure are useful, and preferably contain as a chief component at least one element selected from the first group consisting of Mo, W, V, Nb and Ta. Moreover, the advantages brought about by the magnetic layer 14 have been recognized not only when Co—Cr—Pt or Co—Cr—Ta have been used, but also when employing alloys that contain at least one element selected from Ni, Ti, Zr, Hf, Ta, Pt, Nb, Cr, Mo, W, Si and Ge in addition to Co.

The recording medium constructed according to the teachings of the present invention permits little dispersion of the magnetization, and thus features a high output and low noise. It is therefore possible to obtain a magnetic recording system having a large capacity, and which offers a recording density of as high as 50 kFCI or greater, a S/N of greater than 25 dB, and overwrite characteristics of greater than 26 dB even when the data are recorded using a magnetic head having a track width smaller than 10 μm.

EXAMPLE 3

Plated layer 12 composed of Ni-12P and having a thickness of 13 μm was added to the disk substrate 11 (the numeral proceeding the atomic symbol denotes the content of the element, percent by weight in this case). The disk substrate 11 had an outer diameter of 130 mm, an inner diameter of 40 mm, a thickness of 1.9 mm, and comprised Al-4Mg.

The surface of the plated layer was polished nearly in the circumferential direction (i.e., in which the head runs) until the thickness thereof was 15 μm, and a fine ruggedness or texturing, having an average roughness factor $R_a$ of 5 nm, was provided.

The disk substrate was put into a magnetron sputtering apparatus, and Cr underlayer 13 was formed to a thickness of 300 nm at a temperature of 250° C. and a gas pressure of 2 mtorr (argon, in this case). Metal magnetic layer 14 composed of Co12Cr4Ta was deposited on the underlayer 13 at a thickness of 40 nm. Finally, on the magnetic layer was formed carbon protecting layer 15 to a thickness of 20 nm, and a lubricant layer (not shown) of an adsorptive perfluoroalkylpolyether.

In forming this magnetic recording medium, the evacuation rate during sputter was varied over a range from 2.2 to 5.3 m$^3$/sec (see Table 3, sample numbers 1–7). These samples were examined for their respective oxygen contents in the underlayer, crystal orientation and magnetic recording characteristics. The oxygen content was determined by secondary ion mass spectroscopy or by X-ray fluorescence. Further, the ratios $I_{200}/I_{110}$ of diffraction peak intensities attributable to the (200) and (110) planes of the underlayer were found by X-ray diffraction.

The coercivities in the in-plane direction of the medium samples were measured by the VSM. Moreover, the read/write characteristics of each medium, i.e., the half-output recording density ($D_{50}$) and the S/N value were determined by using a thin-film magnetic head having an effective gap length of 0.4 μm and a track width of 10 μm at a relative speed of 12 m/sec and a spacing of 0.1 μm. The results were as shown in Table 3.

decreased, and a large half-output recording density $D_{50}$ and S/N ratio were obtained when the ratio $I_{200}/I_{110}$ was greater than 0.5 but smaller than 10.

EXAMPLE 4

The plated disk substrate 11 was put into a magnetron sputtering apparatus, and the Cr underlayer 13 was formed on the electroplated layer 12 to a thickness that varied between 3 nm and 500 nm at a temperature of 150° and a gas (argon) pressure of 5 mtorr in the same manner as for Example 3 (see Table 4, sample numbers 8–14). The evacuation rate was optimized as described in Example 3, and the oxygen concentration in the underlayer was set to be smaller than 3 percent by weight.

Magnetic layer 14 was formed of CO-13Cr-4Ta to a thickness of 40 nm. On the magnetic layer was formed a carbon protecting layer 15 to a thickness of 20 nm and, finally, the lubricating layer (not shown) was formed in the same manner as described with respect to Example 3.

The ratio $I_{200}/I_{110}$ was again measured along with the coercivity in the in-plane direction of each recording medium sample. Moreover, the read/write characteristics of the recording media, the half-output recording density $D_{50}$ and the signal noise ratio, were found by using an inductive

TABLE 3

| SAMPLE NO. | EVACUATION RATE (m$^3$/sec) | O$_2$ CONCENTRATION IN THE UNDERLAYER (% by weight) | RATIO $I_{200}/I_{110}$ OF DIFFRACTION INTENSITIES OF UNDERLAYER | COERCIVITY (Oe) | HALF-OUTPUT RECORDING DENSITY $D_{50}$ (kFCI) | S/N (dB) |
|---|---|---|---|---|---|---|
| 1 | 2.2 | 6 | 0.1 | 1100 | 32 | 21 |
| 2 | 2.6 | 3 | 0.2 | 1450 | 50 | 25 |
| 3 | 3.2 | 2 | 0.5 | 1520 | 53 | 27 |
| 4 | 3.5 | 0.1 | 3 | 1630 | 55 | 28 |
| 5 | 3.9 | 0.3 | 10 | 1750 | 56 | 27 |
| 6 | 4.5 | 0.2 | 20 | 1830 | 57 | 26 |
| 7 | 5.3 | 0.1 | 31 | 1830 | 57 | 24 |

As shown in Table 3, the impurity oxygen concentration of the underlayer changed, and the ratio $I_{200}/I_{110}$ of the diffraction peak intensities attributable to the (200) and (110) planes of the underlayer also changed, maintaining good reproducibility depending upon the evacuation rate during the sputtering. Moreover, the coercivity, half-output recording density $D_{50}$ and S/N value changed accompanying the change in the ratio $I_{200}/I_{110}$. In particular, the ratio $I_{200}/I_{110}$ changed over a range of 0.2 to 20 when the impurity oxygen write/magnetoresistive read thin-film magnetic head having a Co—Ta—Zr alloy as a magnetic pole material for recording, and a magnetoresistive-type (MR) read element at a relative speed of 12 m/sec and a spacing of 0.1 μm. The measured results were as shown in Table 4.

TABLE 4

| SAMPLE NO. | THICKNESS OF UNDERLAYER (nm) | RATIO $I_{200}/I_{110}$ OF X-RAY OF DIFFRACTION INTENSITIES OF UNDERLAYER | COERCIVITY (Oe) | HALF-OUTPUT RECORDING DENSITY $D_{50}$ (kFCI) | S/N (dB) |
|---|---|---|---|---|---|
| 8 | 500 | 0.1 | 1350 | 46 | 22 |
| 9 | 300 | 0.3 | 1510 | 51 | 25 |
| 10 | 150 | 2 | 1530 | 53 | 27 |
| 11 | 50 | 5 | 1630 | 54 | 28 |
| 12 | 20 | 7 | 1610 | 54 | 28 |
| 13 | 5 | 10 | 1530 | 53 | 27 |
| 14 | 3 | 22 | 1460 | 47 | 23 | concentration was greater than 0.1 percent by weight, but smaller than 3 percent by weight, and a high half-output recording density $D_{50}$ and a large S/N ratio were obtained. The table further shows that the noise of the medium greatly As shown in Table 4, the ratio $I_{200}/I_{110}$ changed with the change in thickness of the underlayer, resulting in a change in coercivity, half-output recording density $D_{50}$ and S/N ratio. Particular, the ratio $I_{200}/I_{110}$ ranged from 0.5 to 10 when the thickness of the underlayer ranged from 5 nm to 300 nm. In this case, the noise of the medium greatly decreased, and a large half-output recording density $D_{50}$ and S/N ratio were obtained.

EXAMPLE 5

In the same manner as in Example 3, the plated disk substrate 11 was placed in a magnetron sputtering apparatus, and underlayer 13 of various compositions of Cr—Ti alloy was formed at a temperature of 200° C. and a gas (argon) pressure of 2 mtorr while changing the concentration of Ti added to the underlayer over a range of zero to 40 at % (see Table 5, sample numbers 15–21). The evacuation rate was optimized in the same manner as in Example 3 in order to set the oxygen content in the underlayer to be less than 3 percent by weight.

Magnetic layer 14 was formed of Co-13Cr6Pt to a thickness of 30 nm. Carbon protecting layer 15 (thickness 10 nm) and a lubricating layer (not shown) were formed over the magnetic layer 14 in the same manner as in Example 3.

The ratio $I_{200}/I_{110}$ and the coercivity in the in-plane direction of the recording medium samples were measured as before. Moreover, the read/write characteristics of the medium were found by the same methods as for Example 4. The measured results were as shown in Table 5.

EXAMPLE 6

In the same manner as in Example 3, the plated disk substrate 11 was placed into the magnetron sputtering apparatus, and the Cr alloy underlayer 13 was formed to a thickness of 40 nm at 150° C. and 2 mtorr argon pressure while adding at least one element selected from a second group consisting of Mn, Co, Si, Ga, Ge, V, Cu and Zn to the underlayer in an amount of 5 at % (see Table 6, sample numbers 23–30). For comparison, a sample with no such addition was prepared (sample number 22). The evacuation rate was optimized in the same manner as in Example 3 to set the oxygen content of the underlayer to be less than 3 percent by weight. Metal magnetic layer 14 composed of Co-13Cr-4Pt was then formed on the underlayer to a thickness of 30 nm. Finally, a carbon protecting layer 15 was formed on the magnetic layer 14 to a thickness of 10 nm, followed by the lubricating layer (not shown) in the same manner as in Example 3.

The ratio $I_{200}/I_{110}$ and coercivity in the in-plane direction were measured for each according medium sample, and the read/write characteristics were again found by the same methods as for Example 4. The measured results were as shown in Table 6.

TABLE 5

| SAMPLE NO. | Ti CONCENTRATION (atomic %) | RATIO $I_{200}/I_{110}$ OF X-RAY DIFFRACTION INTENSITIES OF UNDERLAYER | COERCIVITY (Oe) | HALF-OUTPUT RECORDING DENSITY $D_{50}$ (kFCI) | S/N (dB) |
|---|---|---|---|---|---|
| 15 | 0 | 19 | 1910 | 50 | 25 |
| 16 | 1 | 10 | 2280 | 53 | 27 |
| 17 | 5 | 5 | 2430 | 54 | 29 |
| 18 | 10 | 2 | 2510 | 55 | 28 |
| 19 | 20 | 1.3 | 2480 | 54 | 28 |
| 20 | 30 | 0.5 | 2460 | 53 | 27 |
| 21 | 40 | 0.2 | 2260 | 51 | 25 |

As shown in Table 5, the ratio $I_{200}/I_{110}$ changed with the change in the Ti concentration in the underlayer, resulting in changes in the coercivity, half-output recording density $D_{50}$ and S/N ratio. In particular, ratio $I_{200}/I_{110}$ ranged from 0.5 to 10 when the Ti concentration in the underlayer ranged from 1 at % to 30 at %. Again, the noise of the medium greatly decreased, while the half-output recording density $D_{50}$ and the S/N ratio were large.

TABLE 6

| SAMPLE NO. | ELEMENT ADDED | RATIO $I_{200}/I_{110}$ OF X-RAY DIFFRACTION INTENSITIES OF UNDERLAYER | COERCIVITY (Oe) | HALF-OUTPUT RECORDING DENSITY $D_{50}$ (kFCI) | S/N (dB) |
|---|---|---|---|---|---|
| 22 | NO ADDITION | 19 | 1910 | 50 | 25 |
| 23 | Mn | 10 | 2390 | 53 | 27 |
| 24 | Co | 0.9 | 2220 | 53 | 28 |
| 25 | Si | 0.7 | 2260 | 53 | 27 |
| 26 | Ga | 1.1 | 2270 | 53 | 28 |
| 27 | Ge | 0.9 | 2270 | 53 | 27 |
| 28 | V | 9 | 2330 | 55 | 28 |
| 29 | Cu | 0.7 | 2350 | 55 | 27 |
| 30 | Zn | 0.5 | 2280 | 53 | 27 |

As shown in Table 6, the ratio $I_{200}/I_{110}$ was greater than 0.5 but smaller than 10, and the half-output recording density $D_{50}$ and the S/N value were improved for the samples having the addition of the element from the second group, when compared with the sample having no addition (sample number 22). More particularly, the ratio $I_{200}/I_{110}$ ranged from 0.5 to 10 when such an element was added at a concentration of greater than 1 at % but smaller than 30 at %. Again, the noise from the medium greatly decreased, particularly when the concentration of the added element fell between 5 at % and 15 at %, and a large half-output recording density $D_{50}$ and S/N ratio were obtained.

EXAMPLE 7

In the same manner as in Example 3, the plated disk substrate 11 was placed into the magnetron sputtering apparatus, and Cr alloy underlayer 13 was formed to a thickness of 40 nm at 300° C. and an argon pressure of 2 mtorr. For this example, at least one element selected from a third group consisting of Ru, Rh, Pd, Os, Ir, Pt and Au was added to the underlayer in an amount of 1 at % (see Table 7, sample numbers 32–38). For comparison, a sample with no such addition was prepared (sample number 31). The evacuation rate was again optimized in the manner of Example 3 to establish the oxygen content of the underlayer to be smaller than 3 percent by weight.

Metal magnetic layer 14 composed of Co-14Cr-6Pt was formed on the underlayers to a thickness of 30 nm. Carbon protecting layer 15 was again formed on the magnetic layer 14 to a thickness of 10 nm, followed by the lubricating layer (not shown) in the same manner as in Example 3.

Ratio $I_{200}/I_{110}$ and the coercivity in the in-plane direction were measured for each medium sample. Again, the read/write characteristics of the media were found by the same methods as for Example 4. The measured results were as shown in Table 7.

EXAMPLE 8

In the same manner as in Example 3, the plated disk substrate 11 was placed into the magnetron sputtering apparatus, and an intermediate layer 10 was formed on the electroplated layer 12. At least one element of a fourth group consisting of Ni, Mg, Al, Si, Ti, Zr, Cr, Mn, Cu, Zn, Mo, W, Nb, Ta, Pt, Pd, Rh, Ru, Os, Au and Ir comprised the intermediate layer, which was formed to a thickness of 10 nm (see Table 8, sample numbers 40–60). For comparison, a sample having no intermediate layer was prepared (sample number 39).

Underlayer 13 composed of Cr-10Ti was formed on the intermediate layer 10 to a thickness of 40 nm. Then, the evacuation rate was optimized in the same manner as for Example 3 to establish the oxygen content of the underlayer 13 to be smaller than 3 percent by weight.

Magnetic layer 14 composed of Co-5Cr-8Pt was formed on underlayer 13 to a thickness of 30 nm. Carbon protecting layer 15 was again formed on magnetic layer 14 to a thickness of 10 nm. Finally, a lubricating layer (not shown) was formed on the carbon protecting layers in the same manner as for Example 3.

Again, the ratios $I_{200}/I_{110}$ and coercivities in the inplane direction were measured for the medium samples. The read/write characteristics of the media were also found by the same method as for Example 4. The measured results were as shown in Table 8.

TABLE 7

| SAMPLE NO. | ELEMENT ADDED | RATIO $I_{200}/I_{110}$ OF X-RAY DIFFRACTION INTENSITIES OF UNDERLAYER | COERCIVITY (Oe) | HALF-OUTPUT RECORDING DENSITY $D_{50}$ (kFCI) | S/N (dB) |
|---|---|---|---|---|---|
| 31 | NO ADDITION | 19 | 1910 | 50 | 25 |
| 32 | Ru | 10 | 2380 | 54 | 28 |
| 33 | Rh | 0.7 | 2270 | 53 | 27 |
| 34 | Pd | 0.9 | 2360 | 54 | 27 |
| 35 | Os | 1.0 | 2300 | 53 | 27 |
| 36 | Ir | 0.9 | 2330 | 53 | 28 |
| 37 | Pt | 0.5 | 2270 | 53 | 27 |
| 38 | Au | 0.6 | 2380 | 54 | 28 |

As shown in Table 7, the ratio $I_{200}/I_{110}$ was greater than 0.5 but smaller than 10 for the sample media having the added element, while the half-output recording density $D_{50}$ and S/N value were improved, compared with those of the sample having no addition (sample number 31). More particularly, the ratio $I_{200}/I_{110}$ ranged from 0.5 to 10 when the element was added at a concentration of greater than 0.01 at % but smaller than 5 at %. Medium noise greatly decreased when the concentration of the added element was greater than 0.5 at % but smaller than 2 at %, and a large half-output recording density $D_{50}$ and S/N value were again obtained.

TABLE 8

| SAMPLE NO. | INTERMEDIATE LAYER | RATIO $I_{200}/I_{110}$ OF X-RAY DIFFRACTION INTENSITIES OF UNDERLAYER | COERCIVITY (Oe) | HALF-OUTPUT RECORDING DENSITY $D_{50}$ (kFCI) | S/N (dB) |
|---|---|---|---|---|---|
| 39 | NONE | 19 | 1710 | 50 | 25 |
| 40 | Ni | 4 | 2390 | 53 | 27 |
| 41 | Mg | 7 | 2320 | 53 | 27 |
| 42 | Al | 8 | 2460 | 53 | 27 |
| 43 | Si | 5 | 2480 | 54 | 28 |
| 44 | Ti | 0.5 | 2240 | 53 | 27 |
| 45 | Zr | 0.6 | 2230 | 53 | 27 |
| 46 | Cr | 10 | 2450 | 53 | 28 |
| 47 | Mn | 2 | 2410 | 53 | 27 |
| 48 | Cu | 3 | 2310 | 53 | 27 |
| 49 | Zn | 6 | 2360 | 53 | 27 |
| 50 | Mo | 10 | 2480 | 54 | 29 |
| 51 | W | 9 | 2430 | 53 | 27 |
| 52 | Nb | 8 | 2340 | 53 | 27 |
| 53 | Ta | 9 | 2350 | 53 | 28 |
| 54 | Pt | 0.5 | 2210 | 53 | 27 |
| 55 | Pd | 0.9 | 2260 | 53 | 28 |
| 56 | Rh | 0.6 | 2220 | 53 | 28 |
| 57 | Ru | 0.8 | 2270 | 53 | 27 |
| 58 | Os | 0.9 | 2230 | 53 | 28 |
| 59 | Au | 0.7 | 2240 | 53 | 27 |
| 60 | Ir | 0.8 | 2250 | 53 | 27 |

As shown in Table 8, the ratio $I_{200}/I_{110}$ was greater than 0.5 but smaller than 10 by the formation of the intermediate layers composed as described above. The noise from the medium greatly decreased, and a large half-output recording density $D_{50}$ and S/N ratio were obtained for the samples, compared with those of the sample having no intermediate layer (sample number 39). Similarly, a large half-output recording density $D_{50}$ and S/N ratio were obtained for the samples having intermediate layers, even when the intermediate layer thickness was varied over a range of 2 nm to 100 nm.

When the intermediate layer 10 was formed of an alloy containing two or more of the elements selected from the fourth group listed above, at concentrations of greater than 1 at % but less than 99 at %, within the thickness range mentioned above, favorable ratios of $I_{200}/I_{110}$ and large half-output recording densities $D_{50}$ and S/N ratios were also obtained.

A magnetic recording system assembled to incorporate a magnetic recording medium constructed according to the teachings of the embodiments outlined above may include a Co—Ta—Zr alloy as the magnetic pole material for the recording head, in combination with MR-type composite thin-film magnetic read heads. The basic system, shown in FIG. 3, may further include conventional elements such as a magnetic recording medium drive unit 42, magnetic heads 43, a magnetic head drive unit 44, and a read/write signal processing system 45, as previously noted.

With this system, read/write characteristics for a small head spacing of 0.1 μm results in the areal density being increased to two or more times that of the prior art systems, which provides a magnetic recording system having a smaller size than those of the prior art.

Although a MR-type composite thin-film magnetic head using a Co—Ta—Zr alloy as the magnetic pole material is described, similar effects can be obtained for an inductive write/MR-read thin-film magnetic head using an Ni—Fe or a Co—Fe alloy as the magnetic pole material for recording, as well as for a metal-in-gap (MIG) type inductive write/MR-read composite magnetic head having a CoTaZr or an FeAlSi alloy at the gap, and even for a conventional inductive thin-film head or MIG head.

Figure 5:
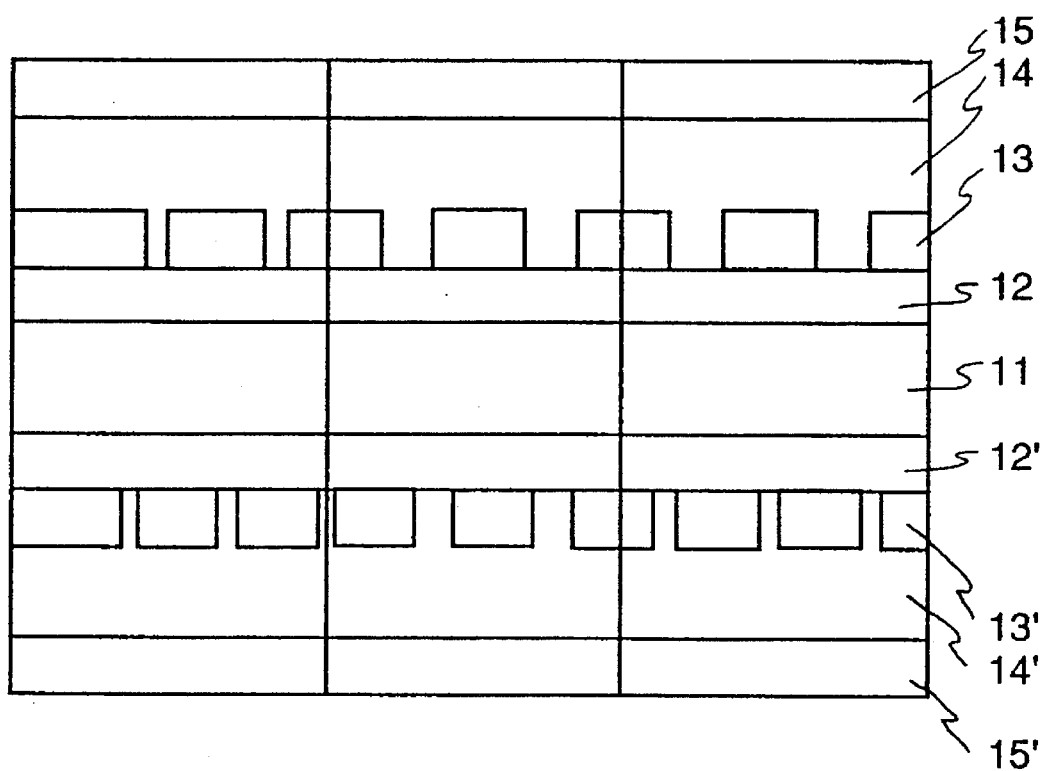
FIG. 5 shows a cross-sectional view of a magnetic recording medium, including a particular underlayer construction, illustrating a further embodiment of the present invention.
Figure 6:
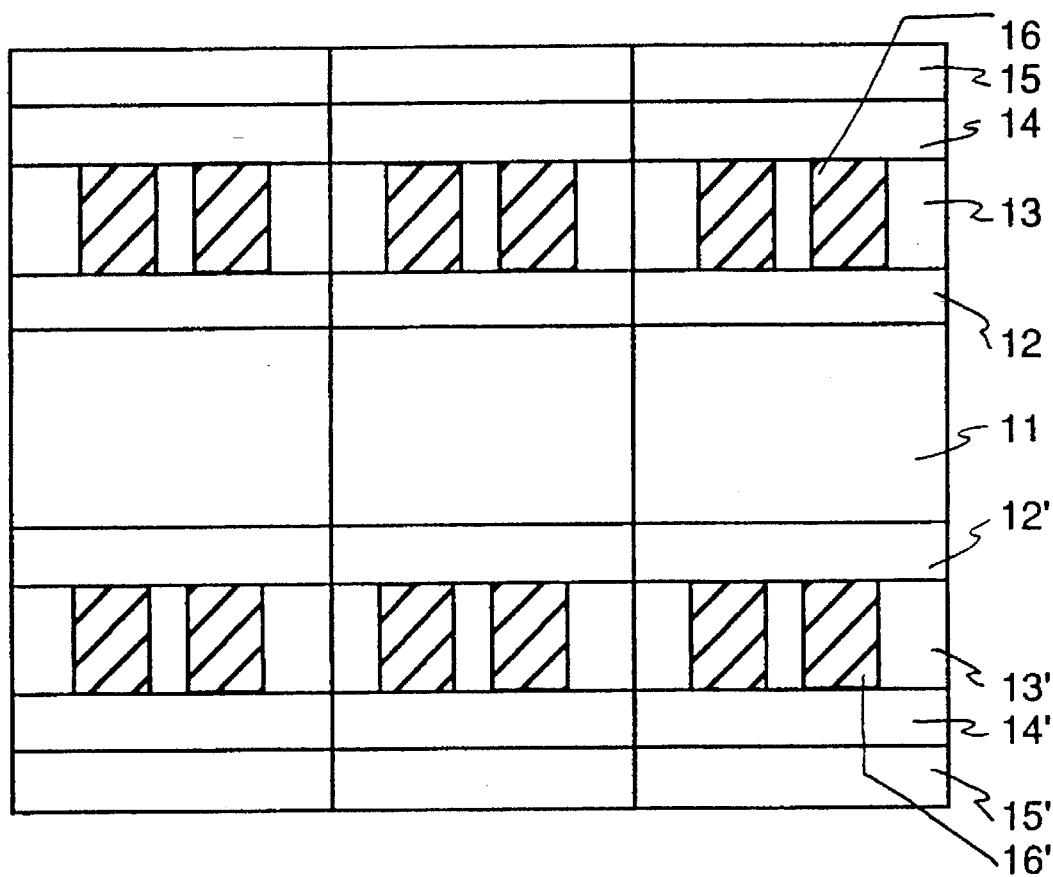
FIG. 6 shows a cross-sectional view of a magnetic recording medium, including another particular underlayer structure, illustrating yet another embodiment of the present invention.
Figure 7:
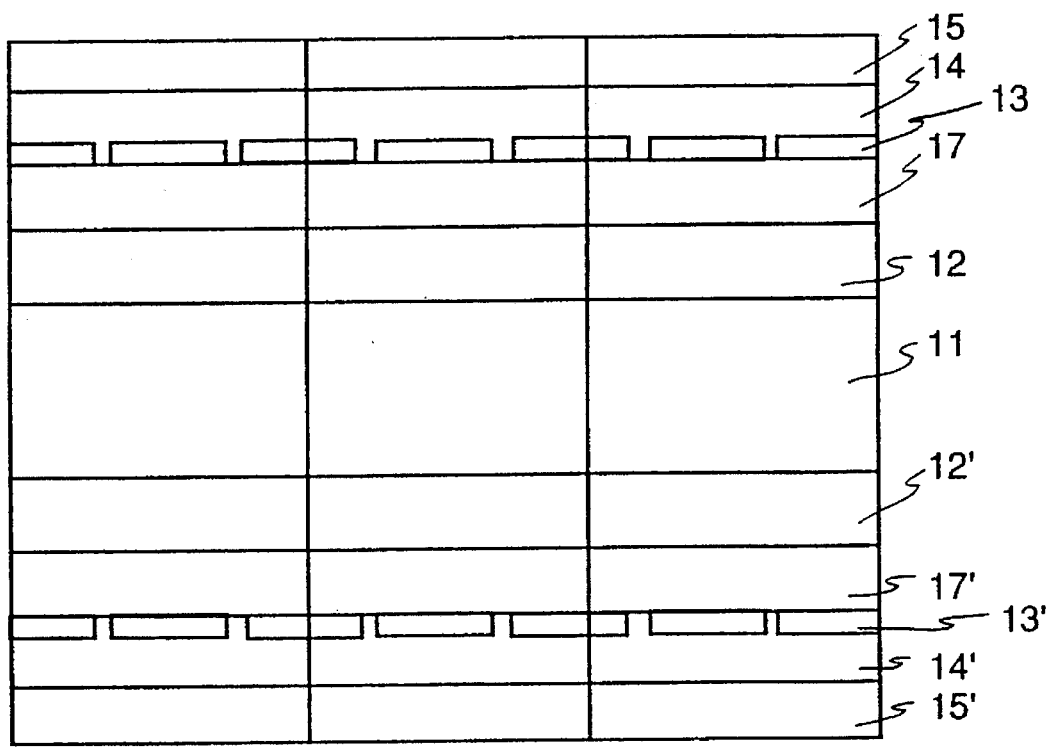
FIG. 7 shows a cross-sectional view of a magnetic recording medium, including a crystal orientation control layer, illustrating yet another embodiment of the present invention.

In yet another embodiment, illustrated in FIGS. 5–7, magnetic disk substrate 11 is preferably plated with a nonmagnetic electroplated layer 12 as before.

Underlayer 13 is then formed on the electroplated layer 12, and chiefly contains at least one element selected from the aforementioned first group. Magnetic layer 14 is formed on underlayer 13, and preferably includes Co—Ni, Co—Cr, Co—Re, Co—Pt, Co—P, Co—Fe, Co—Ni—Zr, Co—Cr—Al, Co—Cr—Ta, Co—Cr—Pt, Co—Ni—Cr, Co—Cr—Nb, Co—Ni—P, Co—Ni—Pt, Co—Cr—Si or the like, in this embodiment.

Nonmagnetic protecting layer 15 is again formed on the magnetic layer 14 and preferably includes carbon, boron, $B_4C$, Si—C, $SiO_2$, $Si_3N_4$, W—C, W—Mo—C, W—n Zr—C or the like.

FIG. 6 shows a preferred embodiment in which underlayer 13 includes one or more component 16 comprising chiefly at least one element selected from the aforementioned second group segregated in the underlayer 13. FIG. 7 illustrates a further embodiment of the invention including crystal orientation control layer 17 formed on the electroplated layer 12, which contains, as a chief component, at least one element selected from the aforementioned second group.

In each of FIGS. 5–7, magnetic layer 14 includes crystal grains having their c axis, i.e., axis of easy magnetization, substantially in parallel with the substrate surface (hereinafter referred to as the substantially in-plane crystal grains), and crystal grains having an axis of easy magnetization substantially perpendicular to the substrate surface (hereinafter referred to as the substantially perpendicular crystal grains).

When the substantially in-plane crystal grains and the substantially perpendicular crystal grains in the magnetic layer 14 are denoted by L and P, respectively, their ratio can be expressed as an L/P value. The L/P value of the inventive recording disk, in a particular embodiment, is preferably greater than 1 but smaller than 20.

In the present embodiment, for a Co-based alloy having the HCP structure, the substantially in-plane crystal grains have their (100), (101) and (110) crystal lattice planes substantially in parallel with the surface of the substrate. The substantially perpendicular crystal grains have their (001) crystal lattice plane substantially in parallel with the substrate surface.

Various methods can be used to establish the L/P value in the desired range. Among these methods are the optimization of the substrate and underlayer structures, including the tailoring of the underlayer crystal orientation and underlayer composition. Then, the magnetic layer 14 can be epitaxially grown as desired.

According to a first such method, specifically shown in FIG. 5, the nonmagnetic metal underlayer 13 contains, as a chief component, at least one element selected from the first group. The underlayer 13 is formed so as to leave a portion of the substrate exposed by an area corresponding to 1% to 30% of the nonmagnetic metal underlayer 13 that is to be formed.

Furthermore, the crystal grains of the underlayer 13 are preferably separated from each other by more than 1 nm but less than 50 nm to achieve writing and reading of high density. Moreover, the crystal grains of underlayer 13 should have a crystal structure of the body-centered cubic lattice type (BCC) to accomplish high-density writing and reading.

The conditions for forming the underlayer 13 should be optimized to achieve these goals. For example, the gas pressure, substrate temperature, layer thickness and deposition rate for the underlayer may be carefully controlled. Of particular importance is the layer thickness, which is preferably between 0.5 nm and 50 nm.

According to a second method, shown in FIG. 6, an additional component 16 is added to the underlayer 13. This additional component 16 is selected from the second group at a concentration of greater than 1 at % but smaller than 30 at %. Again, the chief crystal grains in the underlayers have the BCC-type crystal structure, but the elements selected from the second group are segregated among the crystal grains and/or on the grain boundaries.

According to the third method, schematically illustrated in FIG. 7, crystal orientation control layer 17 contains, as a chief component, at least one element selected from the second group. Then, the underlayer 13 are preferably formed on the crystal orientation control layer 17 to cover less than the entire crystal orientation control layer surface. In a similar manner to the first method, the surface of the crystal orientation control layer 17 is preferably left exposed by an area of greater than 1% but smaller than 30% of the nonmagnetic metal underlayer 13 to be formed.

When constructed according to one of these three methods, the magnetization direction becomes substantially perpendicular in the boundary of a recording bit. Thus, the magnetization repulsion component exists substantially in the perpendicular direction, due to the mixture of substantially in-plane crystal grains and substantially perpendicular crystal grains. As a result, magnetization fluctuation decreases, medium noise decreases for high-density recording, and the $D_{50}$ and S/N values increase.

More particularly, in accordance with the first method for optimizing the L/P value, the direction of easy magnetization of the magnetic layer becomes substantially parallel with the substrate surface where the magnetic layer 14 epitaxially grows on the nonmagnetic underlayer 13 (i.e., over the unexposed substrate), while the crystals of the magnetic layer tend to grow such that their c axes become substantially perpendicular to the surface of the substrate on the area where there exists no nonmagnetic metal underlayer 13 (i.e., over the exposed portion of the substrate), where the direction of easy magnetization of the magnetic layer 14 is substantially perpendicular to the substrate surface. Thus, the magnetic layer 14 is preferably formed so that the substantially in-plane crystal grains and substantially perpendicular crystal grains exist in a mixed manner.

By forming the underlayer 13 according to this method, the contact area between the medium and the magnetic head decreases compared with that for a continuously formed nonmagnetic underlayer, thus increasing the wear resistance of the head and recording medium.

In accordance with the second method, the crystal grains of the magnetic layer 14 epitaxially growing on the crystal lattices of the underlayer 13 have a direction of easy magnetization that is substantially in parallel with the substrate surface. On the region 16 where at least one element selected from the aforementioned second group is contained in a high concentration by the segregation in the underlayer crystallites, however, the magnetic layer crystals grow so that their c axes become substantially perpendicular to the substrate surface, and their directions of easy magnetization are substantially perpendicular to the substrate surface. Accordingly, a similar effect to that of the first method is obtained, wherein the substantially in-grain crystal grains and substantially perpendicular crystal grains exist in a mixed manner.

According to the third method for optimizing the L/P value, the magnetic layer crystals epitaxially grow on the crystal lattices of the nonmagnetic metal underlayer 13 so that the direction of easy magnetization of the magnetic layer 14 becomes substantially in parallel with the substrate surface there. Where the crystal orientation control layer 17 is exposed, however, the crystals of the magnetic layer 14 grow so that their c axes becomes substantially perpendicular to the surface of the substrate 11, thereby making the direction of easy magnetization of the magnetic layer substantially perpendicular to the substrate surface at those locations. Accordingly, as for the first and second methods, the magnetic layer 14 has substantially in-plane crystal grains and substantially perpendicular crystal grains mixed throughout.

Moreover, the crystal orientation control layer 17 gives increased strength to the recording medium, as compared with a medium prepared without a crystal orientation control layer. Thus, the medium having a crystal orientation control layer 17 has increased wear resistance and improved reliability.

The recording medium constructed according to either of these three methods has little fluctuation in the magnetization transition region, and provides less medium noise as compared with the prior art. In a magnetic recording system incorporating the magnetic recording medium, a S/N ratio of greater than 3 is possible at a recording density as high as 50 kFCI or more by using a magnetic head having a track width of smaller than 10 μm. Overwrite characteristics for this system are greater than 26 dB.

EXAMPLE 9

A thin-film type recording medium constructed according to the first method included a plated layer 12 composed of Ni-12P at a thickness of 13 μm on the surface of disk substrate 11. Disk substrate 11 had an outer diameter of 130 mm, an inner diameter of 40 mm and a thickness of 1.9 mm.

The substrate was composed of Al-4Mg. In this example, the surface of the Ni—P plated layer was polished substantially in the circumferential direction to flatten the surface, and, at the same time, fine ruggedness having an average roughness factor $R_a$ of 5 to 10 nm was formed in order to substantially prevent the magnetic head from sticking.

Next, the disk substrate 11 was put into a magnetron sputtering apparatus, and Cr underlayer 13 was formed as described earlier to have various thicknesses at 200° C. and at an argon pressure of 5 mtorr (see Table 9, sample numbers 1–8). For a comparative example, Cr underlayer 13 was formed over the electroplated layer 12, but no portions of the substrate 11 were left exposed.

Magnetic layer 14 composed of Co-12Cr-3Ta was formed on the underlayer 13 to a thickness of 40 nm. Then, carbon protecting layer 15 was formed on magnetic layer 14 to a thickness of 20 nm. Finally, a lubricating layer (not shown) such as of an adsorptive perfluoroalkylpolyether or the like was formed on the carbon protecting layer 15 to complete the thin-film type recording medium.

The cross-sectional shape and the surface shape of the resulting medium were examined using a scanning electron microscope, a transmission electron microscope, or a scanning tunneling electron microscope to determine the ratio S of the exposed area of the substrate to the area of the underlayer. Further, the crystal orientation of the magnetic layers was examined by X-ray diffraction or by electron diffraction, to find the values L and P of the substantially in-plane crystal grains and the substantially perpendicular crystal grains.

Further, the coercivities in the in-plane direction of the medium samples were measured using VSM, and the read/write characteristics of the medium (half-output recording density $D_{50}$ and S/N ratio) were determined using a thin-film magnetic head having an effective gap length of 0.4 μm and a track width of 10 μm at a relative speed of 12 m/sec and a spacing of 0.08 μm. The results were as shown in Table 9.

output recording density greater than 30 kFCI and a S/N ratio greater than 3 was obtained for a ratio S greater than 1% but smaller than 3%. The ratio L/P was within the desired range of 1 and 20.

When the Cr underlayer thickness fell between 0.5 nm and 10 nm, the grain diameter of the Cr underlayer ranged from 1 nm through 50 nm, and the grains were observed separated from each other. Further, by X-ray diffraction, the crystals in the underlayer were seen to be of BCC type. Similar effects were also recognized for an underlayer containing any one of Mo, W, V, Nb or Ta as a chief component instead of Cr.

EXAMPLE 10

A thin-film type recording medium constructed in accordance with the second method included the same disk substrate and electroplated layers as for Example 9. The plated substrate was placed into the magnetron sputtering apparatus, held at 200° C., and underlayer 13 was formed on the substrate. Underlayer 13 contained Cr as a chief component, and also included an element 16 selected from the second group described previously. Underlayer 13 was formed to a thickness of 100 nm under an argon pressure of 2 mtorr (see Table 10, sample numbers 9–33). For a comparative example, no second group element was added to the underlayer.

In this case, the amount of the element of the second group, the time for heating the substrate and the deposition rate were controlled to form underlayers having structures in which the crystal grains containing chiefly Cr possessed the BCC crystal structure, and the elements 16 of the second group were segregated in the crystal grains and among the crystal grains.

Next, on the underlayer was formed metal magnetic layer 14 composed of Co-13Cr-6Pt having a thickness of 30 nm. Carbon protecting layer 15 was formed on the magnetic

TABLE 9

| SAMPLE NO. | THICKNESS OF Cr UNDER-LAYER (nm) | RATIO S OF SUBSTRATE EXPOSED AREA (%) | RATIO L/P OF SUBSTANTIALLY IN-PLANE GRAINS/SUB-STANTIALLY PERPEN-DICULAR GRAINS | COERCIVITY (Oe) | HALF-OUTPUT RECORDING DENSITY $D_{50}$ (kFCl) | S/N OF MEDIA |
|---|---|---|---|---|---|---|
| COMPARATIVE EXAMPLE | 100 | 0 | 21 | 1250 | 29 | 2.3 |
| 1 | 50 | 1 | 20 | 1600 | 35 | 3.9 |
| 2 | 20 | 1 | 10 | 1650 | 44 | 4.7 |
| 3 | 10 | 1 | 5 | 1590 | 43 | 4.9 |
| 4 | 5 | 2 | 3 | 1550 | 42 | 4.8 |
| 5 | 2 | 5 | 3 | 1530 | 39 | 4.2 |
| 6 | 1 | 20 | 3 | 1450 | 35 | 4.0 |
| 7 | 0.5 | 30 | 1 | 1440 | 33 | 3.8 |
| 8 | 0.3 | 60 | 0.5 | 1120 | 23 | 2.2 |

As shown in Table 9, the ratio S of exposed substrate area to unexposed substrate area changed depending upon the thickness of the Cr underlayer 13. Furthermore, the coercivity, half-output recording density $D_{50}$ and S/N ratio vary as well. In particular, a recording medium having a half-layer 14 to a thickness of 20 nm. Finally, a lubricating film (not shown) like that of Example 9 was formed to complete the recording medium.

The measured results were as shown in Tables 10 and 10A.

TABLE 10

| SAMPLE NO. | ELEMENT ADDED | CONCENTRATION OF ADDED ELEMENT (atomic %) | RATIO L/P OF SUBSTANTIALLY IN-PLANE GRAINS/SUBSTANTIALLY PERPENDICULAR GRAINS | COERCIVITY (Oe) | HALF-OUTPUT RECORDING DENSITY $D_{50}$ (kFCI) | S/N OF MEDIA |
|---|---|---|---|---|---|---|
| COMPARATIVE EXAMPLE | NO ADDITION | 0 | 28 | 1180 | 21 | 2.5 |
| 9 | Ti | 5 | 10 | 1710 | 46 | 4.5 |
| 10 | Zr | 5 | 8 | 1780 | 45 | 4.4 |
| 11 | Sc | 2 | 4 | 1710 | 44 | 4.2 |
| 12 | Y | 2 | 8 | 1720 | 43 | 3.1 |
| 13 | Hf | 2 | 7 | 1690 | 45 | 4.6 |
| 14 | Rh | 5 | 20 | 1720 | 39 | 3.8 |
| 15 | Os | 5 | 8 | 1680 | 43 | 4.3 |
| 16 | Zn | 5 | 12 | 1750 | 40 | 3.6 |
| 17 | Cd | 5 | 10 | 1660 | 42 | 4.1 |
| 18 | La | 2 | 7 | 1690 | 44 | 4.6 |
| 19 | Ce | 2 | 6 | 1720 | 43 | 4.4 |
| 20 | Pr | 2 | 11 | 1690 | 37 | 3.6 |
| COMPARATIVE EXAMPLE | NO ADDITION | 0 | 28 | 1180 | 21 | 2.5 |
| 21 | Nd | 2 | 8 | 1740 | 46 | 4.2 |
| 22 | Ir | 5 | 7 | 1720 | 43 | 4.3 |
| 23 | Pt | 5 | 9 | 1730 | 41 | 4.3 |
| 24 | Au | 5 | 8 | 1750 | 43 | 4.1 |
| 25 | Pd | 5 | 6 | 1680 | 44 | 4.5 |
| 26 | Ag | 5 | 12 | 1740 | 39 | 3.8 |
| 27 | Cu | 5 | 9 | 1720 | 45 | 4.6 |
| 28 | Ti | 2 | 13 | 1660 | 40 | 3.9 |
| 29 | Si | 2 | 10 | 1720 | 43 | 4.2 |
| 30 | Ge | 2 | 1 | 1730 | 39 | 3.8 |
| 31 | Sn | 2 | 8 | 1690 | 43 | 4.3 |
| 32 | Pb | 2 | 12 | 1680 | 40 | 3.9 |
| 33 | P | 2 | 10 | 1700 | 42 | 4.0 |

As shown in Tables 10 and 10A, addition of the second group element 16 to the underlayer made it possible to obtain a recording medium having a half-output recording density $D_{50}$ greater than 30 kFCI and a S/N ratio greater than 3. The value L/P fell between 1 and 20, as desired.

X-ray diffraction confirmed that the chief crystal structure in the underlayers was of the BCC type. X-ray fluorescence, Auger electron spectroscopy or X-ray photoelectron spectroscopy further confirmed that the second group element 16 was segregated in the crystal grains and among the crystal grains. Similar effects were also recognized for an underlayer containing any one of Mo, W, V, Nb or Ta as a chief component instead of Cr.

EXAMPLE 11

A thin-film recording medium constructed in accordance with the third method included the same disk substrate and electroplated layers 11 and 12 as for Example 9. The plated disk substrate was placed into a magnetron sputtering apparatus and held at 200° C. to form crystal orientation control layer 17 on the plated substrate. The crystal orientation control layer 17 included an element selected from the second group as previously described. Crystal orientation control layer 17 was formed to a thickness of 100 nm under an argon pressure of 2 mtorr (see Tables 11 and 11A, sample numbers 34–58). For a comparative example, a sample with no crystal orientation control layer was formed.

The Cr underlayer 13 was formed on the crystal orientation control layer 17 to a thickness of 5 nm by the same method as described in Example 9, so that the crystal orientation control layer 17 was left exposed by an area corresponding to 1 to 30% of the Cr underlayer 13.

Next, magnetic layer 14 composed of Co-12Cr-4Ta was formed on underlayer 13 to a thickness of 30 nm. Carbon protecting layer 15 was further formed thereon as before to a thickness of 20 nm, and a lubricating film (not shown) like that of Example 9 was formed to complete the recording medium.

The recording media were then measured for their write/read error bit numbers per unit of recording surface immediately after fabrication and after 50,000 contact start/stop operations (CSS) to measure the increase in errors before and after CSS. Moreover, the crystal orientation of the magnetic layers was examined by the same method as that of Example 9 to determine the L/P ratio and the coercivity in the in-plane direction. The read/write characteristics of the media were measured using the parameters of Example 10 to determine the $D_{50}$ and S/N values. The measured values were as shown in Tables 11 and 11A.

TABLE 11

| SAMPLE NO. | CRYSTAL ORIENTATION CONTROL LAYER ELEMENT | INCREASE IN THE NUMBER OF ERRORS AFTER CSS (bits/surface) | RATIO L/P OF SUBSTANTIALLY IN-PLANE GRAINS/SUB-STANTIALLY PERPEN-DICULAR GRAINS | COERCIVITY (Oe) | HALF-OUTPUT RECORDING DENSITY $D_{50}$ (kFCI) | S/N OF MEDIA |
|---|---|---|---|---|---|---|
| COMPARATIVE EXAMPLE | NONE | 18 | 2 | 1320 | 24 | 2.8 |
| 34 | Ti | 7 | 8 | 1690 | 48 | 4.7 |
| 35 | Zr | 6 | 6 | 1650 | 47 | 4.6 |
| 36 | Sc | 5 | 6 | 1670 | 42 | 4.1 |
| 37 | Y | 7 | 7 | 1680 | 44 | 4.3 |
| 38 | Hf | 9 | 9 | 1690 | 46 | 4.5 |
| 39 | Rh | 5 | 20 | 1750 | 40 | 3.9 |
| 40 | Os | 8 | 10 | 1720 | 44 | 4.5 |
| 41 | Zn | 6 | 16 | 1700 | 41 | 4.2 |
| 42 | Cd | 7 | 13 | 1680 | 43 | 4.1 |
| 43 | La | 7 | 11 | 1670 | 46 | 4.4 |
| 44 | Ce | 9 | 13 | 1710 | 44 | 4.5 |
| 45 | Pr | 8 | 15 | 1710 | 41 | 3.9 |
| COMPARATIVE EXAMPLE | NONE | 18 | 2 | 1320 | 24 | 2.8 |
| 46 | Nd | 5 | 14 | 1730 | 45 | 4.4 |
| 47 | Ir | 9 | 13 | 1700 | 44 | 4.5 |
| 48 | Pt | 8 | 6 | 1670 | 43 | 4.4 |
| 49 | Au | 8 | 15 | 1750 | 42 | 4.3 |
| 50 | Pd | 7 | 12 | 1690 | 45 | 4.5 |
| 51 | Ag | 9 | 16 | 1750 | 41 | 4.0 |
| 52 | Cu | 7 | 11 | 1760 | 46 | 4.5 |
| 53 | Tl | 8 | 10 | 1710 | 45 | 4.4 |
| 54 | Si | 9 | 8 | 1680 | 46 | 4.8 |
| 55 | Ge | 8 | 1 | 1640 | 47 | 4.6 |
| 56 | Sn | 7 | 14 | 1720 | 43 | 4.1 |
| 57 | Pb | 9 | 15 | 1710 | 41 | 3.8 |
| 58 | P | 8 | 10 | 1690 | 40 | 3.4 |

As shown in Tables 11 and 11A, formation of the crystal orientation control layer 17 and Cr underlayer 13 so that the Cr underlayer did not cover the entire crystal orientation control layer resulted in a medium having a half-output recording density $D_{50}$ greater than 30 kFCI and an S/N ratio greater than 3, as contemplated by the invention. Again, the value L/P fell within the desired range of 1 to 20.

Moreover, the number of errors before and after CSS decreased, evidencing the increased wear resistance and reliability of the medium. Similar effects were also recognized for underlayers containing any one of Mo, W, V, Nb or Ta as a chief component instead of Cr.

Figure 3:
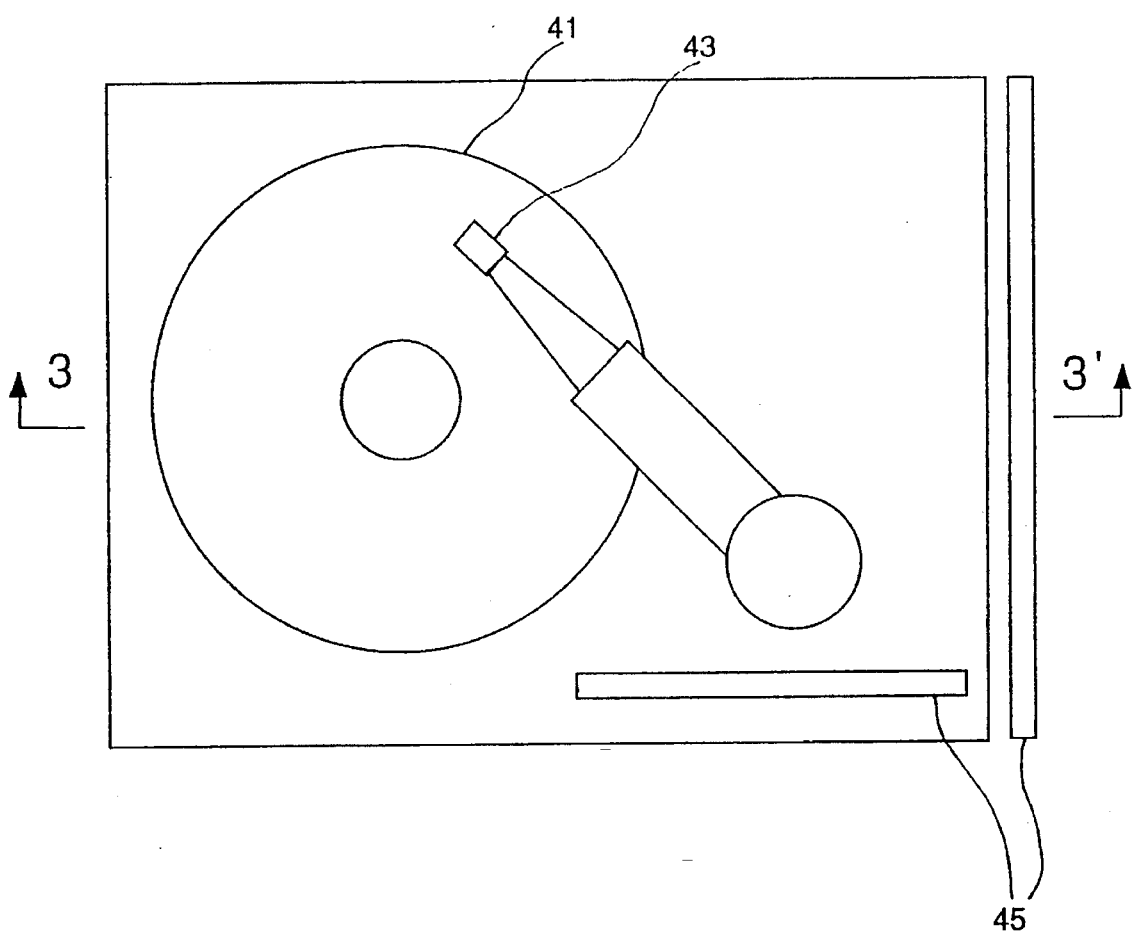
FIGS. 3(a) and 3(b) illustrate a magnetic recording system incorporating a magnetic recording medium constructed according to any of the embodiments of the present invention.
Figure 3:
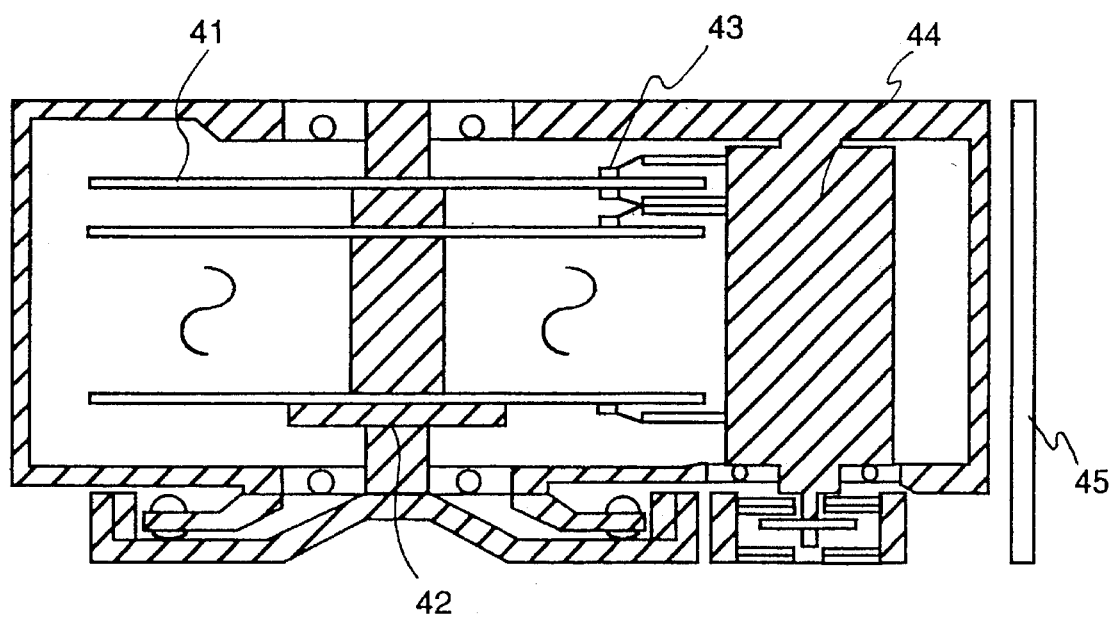

Again, a magnetic recording system can be assembled to incorporate a disk constructed according to any of the three methods, the basic system being shown in FIG. 3. Read/write characteristics for the system show that the areal density could be increased to two or more times that of the prior art systems, in a smaller-sized system.

In addition to the MR-type composite thin-film magnetic head using a CoTaZr alloy for a magnetic pull material, experiments showed that the same effects could be obtained for an inductive write/MR-read thin-film magnetic head using an Ni—Fe or a Co—Fe alloy as a magnetic pole material for recording, for a metal-in-gap type inductive write/MR-read composite magnetic head having a Co—Ta—Zr or FeAlSi alloy at the gap, or for a conventional inductive thin-film head or a MIG head.

Figure 8:
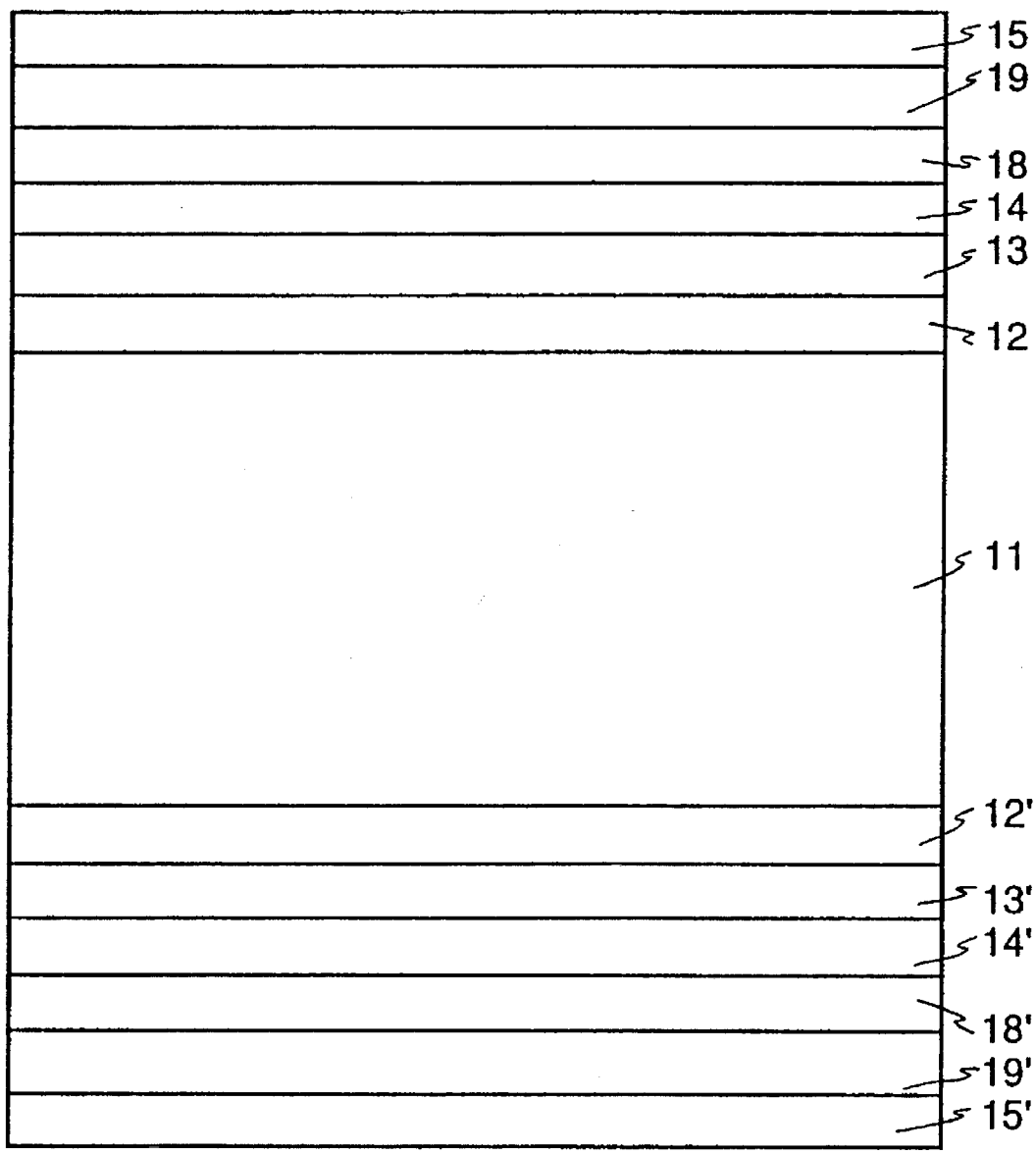
FIG. 8 shows a cross-sectional view of a magnetic recording medium, including two magnetic layers on one side of a disk substrate, illustrating yet a further embodiment of the present invention.

In yet a further embodiment of the invention, two magnetic layers 14, 19 may be provided on the disk substrate, as shown in FIG. 8. The magnetic layers 14, 19 are not identical, but instead have different remanences $B_r$ and thicknesses δ for each magnetic layer, while maintaining an equivalent $B_r\cdot\delta$ for the layers.

Further noted in FIG. 8 is intermediate layer 18, which is preferably a nonmagnetic layer comprising one or more materials selected from the same groups as underlayer 13 with a thickness of 0.1 nm–20 nm. However, in the embodiment shown in FIG. 8, underlayer 13 and intermediate layer 18 are designed to independently orient the magnetic layer 14, 19 overlying it. Thus, for example, underlayer 13 may be constructed to control the orientation of substantially inplane crystal grains of magnetic layer 14, while intermediate layer 18 may be constructed to control the substantially perpendicular crystal grains of magnetic layer 19. Other constructions of underlayer 13 and intermediate layer 18 are contemplated by the invention, depending upon the specific characteristics desired for magnetic layers 14, 19.

Figure 9:
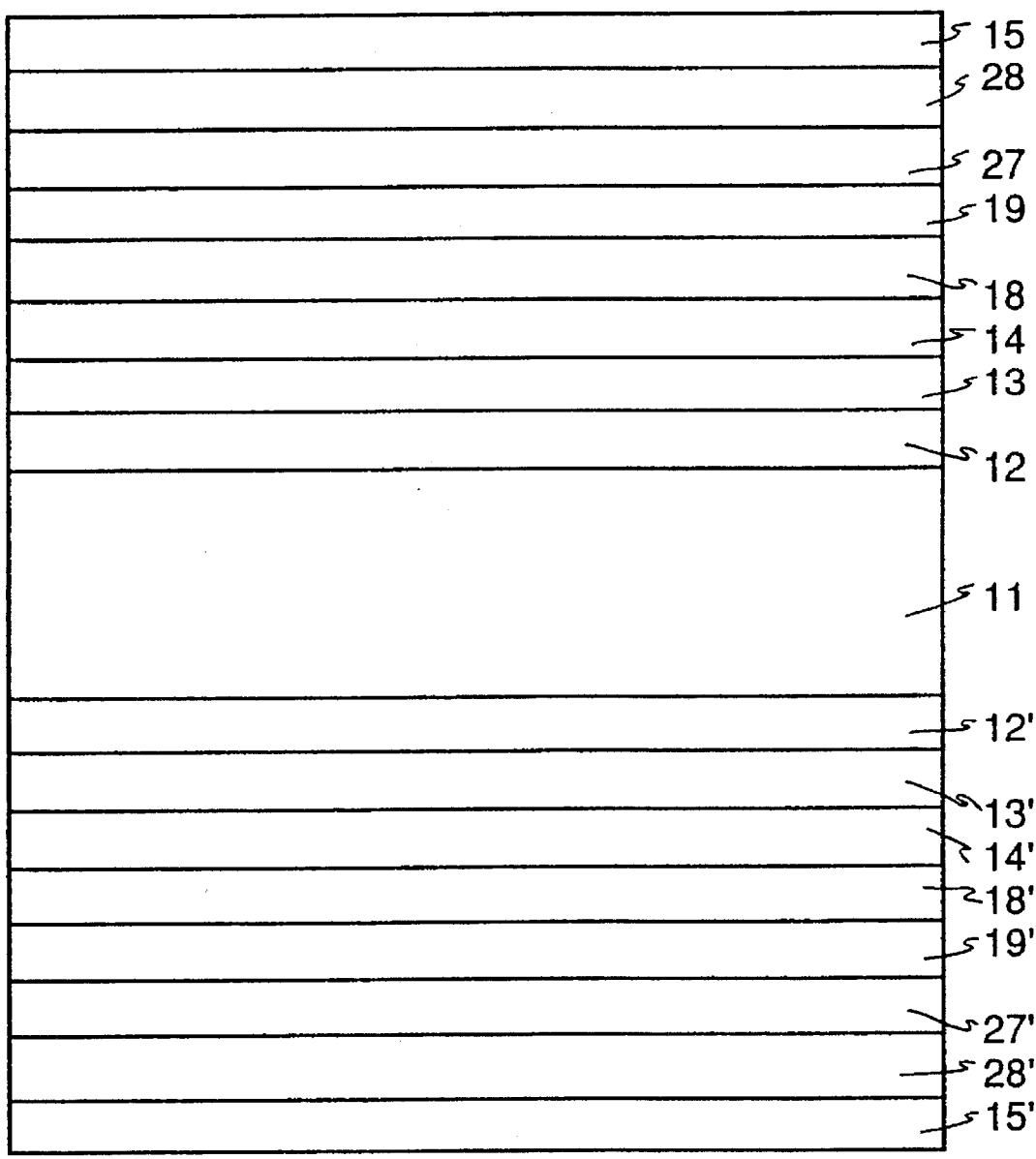
FIG. 9 shows a cross-sectional view of a magnetic recording medium, including three magnetic layers on one side of a disk substrate, illustrating yet a further embodiment of the present invention.

FIG. 9 shows an additional embodiment in which three magnetic layers and associated control layers are proposed. As shown in FIG. 9, underlayer 13 controls magnetic layer 14, intermediate layer 18 controls magnetic layer 19, and intermediate layer 27 controls magnetic layer 28. Again, intermediate layer 27 may be constructed in a fashion similar to the various embodiments previously described regarding underlayer 13.

These embodiments optimize the remanence and in-plane coercivities of the recording medium in accordance with the advantages flowing from each type of magnetic material. Accordingly, any of the magnetic materials described above could be used for either layer, and should be selected in accordance with the desired magnetic characteristics of each layer, subject to the requirement that the dot product $B_r\cdot\delta$ be the same for each layer.

The S/N ratio is increased by using a thinner magnetic layer because the crystallite grain size of the magnetic layer is decreased by thinning the film, and thus, the medium noise is remarkably reduced. To get enough read output with a low noise, it is effective to stack the multiple thin magnetic films separated with non-magnetic intermediate layers which reduce the magnetic exchange coupling between adjacent magnetic layers.

For the case of utilizing an inductive magnetic head for reading, a higher read output is obtained when a thin magnetic film with a higher remanence $B_r$ is formed near to the head and a lower $B_r$ magnetic film is formed on the substrate side under the higher $B_r$ film. This is because a higher output is generated when the magnetization of the medium, that is expressed as a product of $B_r$ and magnetic layer thickness $\delta$, is higher at the film nearer to the surface where the head field is stronger, from a view point of the low reciprocity.

On the other hand, for the case of utilizing a magnetoresistive (MR) head for reading, a better S/N ratio with notably low media noise is realized when a thin magnetic film is formed on the substrate side under the lower $B_r$ film. This is because lower media noise is generated when the magnetization of the medium ($B_r \cdot \delta$) is lower at the film nearer to the MR head.

Moreover, by equalizing the value of $B_r \cdot \delta$ by changing the thickness $\delta$ of each separated magnetic layer with a different $B_r$ as mentioned above, the media noise is extremely reduced. This is because a well-balanced magnetic static interaction between adjacent separated magnetic layers having identical values of $B_r \cdot \delta$ causes a notable reduction of magnetization dispersion at a transition region between the recorded bits in the medium.

The thickness of the non-magnetic intermediate layer is preferably greater than 0.1 nm but less than 20 nm. An intermediate layer with a thickness greater than 0.1 nm reduces the magnetic exchange coupling between adjacent magnetic layers without a crystallite grain growth of the magnetic layer. However, the intermediate layer with a thickness greater than 20 nm degrades overwrite characteristics because the distance between the write head and the lower-most magnetic layer is too large to overwrite bits in the film.

EXAMPLE 12

An Al—Mg alloy substrate, with an outer diameter of 95 mm plated with Ni—P on both sides each to a thickness of 10 μm was treated with abrasive grains to provide fine scars approximately in the circumferential direction on the surface, and thus the magnetic disk substrate 11 (see FIG. 8) having a surface roughness of 5 nm in terms of center-line average roughness was obtained. On both surfaces of the substrate were formed a non-magnetic layer 13, having a thickness of 50 nm by DC magnetron sputtering at a substrate temperature of 300° C. under an argon gas pressure of 1.7 mtorr with an input power density of 5 W/cm². Non-magnetic alloy compositions were Cr, Cr-5at%Fe, Cr-5at%V, Cr-5at%Cu, Cr-15at%Ti, Mo-5at%Si, Mo-5at%V, W, W-5at%Mo, Ta, Ta-5at%Cr, Nb, Nb-5at%W, as shown in Table 12. Then, a magnetic layer 14, of magnetic alloy such as Co-15at%Cr-4at%Pt, Co-12at%Cr-4at%Ta, Co-4at%Ta, Co-30at%Ni-5at%Pt, was formed to a thickness of 15 nm, a nonmagnetic intermediate layer 18, of a non-magnetic alloy such as Cr, W, Cr-15at%Ti, Cr-5at%Si, Cr-5at%Nb, Cr-5at%Rh, Cr-5at%Pt, Cr-5at%Ge, Cr-5at%Ru, Cr-5at%W, Cr-5at%Mo, was formed to a thickness of 10 nm, and a magnetic layer 19, of a magnetic alloy such as Co-14at%Cr-4at%Pt, Co-12at%Cr-4at%Ta, Co-20at%Ni10at%Cr or Co-35at%Ni4at%Zr, was formed to a thickness so that the product of the residual magnetic flux density $B_r$ and the magnetic layer thickness $\delta$ was equal to the $B_r \cdot \delta$ product in 14. Then a C, W—C, or W—Mo—C protective layer was formed to a thickness of 25 nm under the same conditions. Here, the values of $B_r$ for the magnetic alloys Co—Cr—Pt, Co—Cr—Ta, Co—Ni—Cr, Co—Ni—Zr, and Co—Ni—Pt were 8000 Gauss, 7500 Gauss, 8500 Gauss, and 10000 Gauss, respectively. Finally, a layer of a perfluoroalkylpolyether-based liquid lubricant were formed thereon each to 5 nm to make a magnetic disk. The read and write characteristics of each medium, i.e. the half-output recording density ($D_{50}$) and S/N value at a linear density of 65 kFCI were determined by using a thin-film magnetic head having a Ni—Fe alloy as a magnetic pole material for recording with an effective gap length of 0.4 μm. The MR-type composite thin-film magnetic read head was also utilized as a high output reading device.

Tables 12–18 illustrate the advantages of a magnetic recording medium constructed having multiple magnetic layers on each side of the disk substrate. Tables 12–13 and 15–18 show read/write characteristics of magnetic recording media constructed according to these embodiments, for a variety of materials for the underlayers and magnetic layers. Particularly, Table 18 shows the read/write characteristics measured by using a MR-type composite thin-film read head for media which are also listed in Table 12 as example numbers 1–12. Table 14 shows read/write characteristics of magnetic recording media constructed according to the conventional teachings.

As before, a recording system as shown in FIG. 3, but incorporating a magnetic recording medium constructed with a plurality of magnetic layers is contemplated within the scope of the present invention. Tables 12–18 illustrate how such a system can benefit from the inventive magnetic recording media.

TABLE 12

R/W CHARACTERISTICS OF MAGNETIC RECORDING MEDIA ACCORDING TO THE PRESENT INVENTION

|  |  | 13, 13' | 14, 14' (THICKNESS IN Å) | 18, 18' | 19, 19' (THICKNESS IN Å) | 15, 15' | S/N [dB] | $D_{50}$[kFCI] |
|---|---|---|---|---|---|---|---|---|
| EXAMPLE NO 1 | 1 | Cr | CoCrTa(150) | CrTi | CoCrPt(141) | C | 30 | 70.0 |
|  | 2 | Cr | CoCrTa(150) | CrSi | CoNiCr(132) | C | 27 | 68.5 |
|  | 3 | Cr | CoCrPt(150) | Cr | CoNiZr(126) | C | 31 | 67.8 |
|  | 4 | CrFe | CoCrTa(150) | CrTi | CoCrPt(141) | C | 29 | 67.3 |
|  | 5 | CrV | CoCrTa(150) | CrNb | CoCrPt(141) | C | 29 | 68.2 |
|  | 6 | CrCu | CoCrPt(150) | CrRh | CoCrTa(160) | C | 28 | 70.5 |
|  | 7 | CrTi | CoCrPt(150) | Cr | CoCrTa(160) | C | 30 | 71.7 |
|  | 8 | CrTi | CoCrPt(150) | CrSi | CoNiZr(126) | C | 32 | 68.4 |
|  | 9 | CrTi | CoCrPt(150) | CrPt | CoCrTa(160) | C | 26 | 67.5 |
|  | 10 | CrTi | CoCrPt(150) | W | CoCrTa(160) | C | 26 | 68.0 |

TABLE 12-continued

R/W CHARACTERISTICS OF MAGNETIC RECORDING MEDIA ACCORDING TO THE PRESENT INVENTION

|    | 13, 13' | 14, 14' (THICKNESS IN Å) | 18, 18' | 19, 19' (THICKNESS IN Å) | 15, 15' | S/N [dB] | $D_{50}$[kFCl] |
|----|---------|--------------------------|---------|--------------------------|---------|----------|----------------|
| 11 | CrTi    | CoCrPt(150)              | CrGe    | CoCrTa(160)              | C       | 28       | 72.0           |
| 12 | CrTi    | CoCrTa(150)              | CrTi    | CoCrPt(141)              | C       | 31       | 71.3           |
| 13 | —       | CoNiPt(150)              | CrRu    | CoCrTa(200)              | C       | 27       | 68.5           |
| 14 | —       | CoCrPt(150)              | CrTi    | CoCrTa(160)              | C       | 26       | 66.6           |
| 15 | MoSi    | CoCrPt(150)              | W       | CoCrTa(160)              | C       | 26       | 67.2           |
| 16 | MoV     | CoCrPt(150)              | CrTi    | CoCrTa(160)              | C       | 28       | 67.8           |
| 17 | W       | CoCrPt(150)              | Cr      | CoCrTa(160)              | C       | 28       | 67.4           |
| 18 | WMo     | CoCrPt(150)              | CrW     | CoCrTa(160)              | C       | 28       | 68.6           |
| 19 | Ta      | CoCrPt(150)              | Cr      | CoCrTa(160)              | WC      | 26       | 66.9           |
| 20 | TaCr    | CoCrPt(150)              | CrMo    | CoCrTa(160)              | WMoC    | 27       | 68.8           |
| 21 | Nb      | CoCrPt(150)              | Cr      | CoCrTa(160)              | WC      | 27       | 67.5           |
| 22 | NbW     | CoCrPt(150)              | CrNb    | CoCrTa(160)              | WMoC    | 28       | 67.2           |

TABLE 13

R/W CHARACTERISTICS OF MAGNETIC RECORDING MEDIA ACCORDING TO THE CONVENTIONAL METHOD

|                        |    | 13, 13' | 14, 14' (Å) | 18, 18' | 19, 19' (Å) | 15, 15' | S/N [dB] | $D_{50}$[kFCl] |
|------------------------|----|---------|-------------|---------|-------------|---------|----------|----------------|
| COMPARATIVE EXAMPLE NO 1 | 23 | Cr      | CoCrTa(150) | Cr      | CoCrTa(150) | C       | 23       | 63.5           |
|                        | 24 | CrTi    | CoCrPt(150) | CrTi    | CoCrPt(150) | C       | 24       | 64.0           |
|                        | 25 | Mo      | CoCrTa(150) | Mo      | CoCrTa(150) | C       | 23       | 63.5           |
|                        | 26 | W       | CoCrTa(150) | W       | CoCrTa(150) | C       | 22       | 62.5           |

TABLE 14

R/W CHARACTERISTICS OF MAGNETIC RECORDING MEDIA ACCORDING TO THE CONVENTIONAL METHOD

|                        |    | 13, 13' | 14, 14' (Å)  | 15, 15' | S/N [dB] | $D_{50}$[kFCl] |
|------------------------|----|---------|--------------|---------|----------|----------------|
| COMPARATIVE EXAMPLE NO 2 | 27 | Cr      | CoCrPt(300)  | C       | 20       | 61.2           |
|                        | 28 | Cr      | CoCrTa(300)  | C       | 19       | 61.5           |
|                        | 29 | Cr      | CoNiCr(300)  | C       | 17       | 60.0           |
|                        | 30 | Cr      | CoNiZr(300)  | C       | 16       | 59.2           |
|                        | 31 | CrTi    | CoCrPt(300)  | C       | 22       | 62.0           |
|                        | 32 | CrTi    | CoCrTa(300)  | C       | 22       | 61.6           |
|                        | 33 | CrTi    | CoNiCr(300)  | C       | 20       | 61.8           |
|                        | 34 | CrTi    | CoNiZr(300)  | C       | 19       | 60.4           |

TABLE 15

R/W CHARACTERISTICS OF MAGNETIC RECORDING MEDIA ACCORDING TO THE PRESENT INVENTION

|              |    | 13, 13' | 14,14' (Å)   | (mtorr) | 18, 18' | 19, 19' (Å)  | (mtorr) | 15, 15' | S/N [dB] |
|--------------|----|---------|--------------|---------|---------|--------------|---------|---------|----------|
| EXAMPLE NO 2 | 35 | Cr      | CoCrTa(150)  | (1.7)   | Cr      | CoCrTa(170)  | (10)    | C       | 29       |
|              | 36 | Cr      | CoCrPt(150)  | (5.0)   | Cr      | CoCrPt(165)  | (15)    | C       | 31       |
|              | 37 | CrTi    | CoCrTa(150)  | (5.0)   | CrTi    | CoCrTa(130)  | (3.0)   | C       | 27       |
|              | 38 | CrTi    | CoCrPt(150)  | (10)    | CrTi    | CoCrPt(130)  | (5.0)   | C       | 30       |

TABLE 16

R/W CHARACTERISTICS OF MAGNETIC RECORDING MEDIA ACCORDING TO THE PRESENT INVENTION

|              |    | 13, 13' | 14, 14 (Å)  | 18, 18' | 19 19' (Å)   | 27, 27' | 28, 28' (Å)  | 15, 15' | S/N [dB] |
|--------------|----|---------|-------------|---------|--------------|---------|--------------|---------|----------|
| EXAMPLE NO 3 | 39 | CrTi    | CoCrTa(150) | Cr      | CoNiPt(113)  | CrTi    | CoCrPt(141)  | C       | 31       |
|              | 40 | Cr      | CoNiCr(150) | Cr      | CoCrPt(159)  | Cr      | CoCrTa(170)  | C       | 30       |

TABLE 16-continued

R/W CHARACTERISTICS OF MAGNETIC RECORDING MEDIA ACCORDING TO THE PRESENT INVENTION

| | 13, 13' | 14, 14' (Å) | 18, 18' | 19 19' (Å) | 27, 27' | 28, 28' (Å) | 15, 15' | S/N [dB] |
|---|---|---|---|---|---|---|---|---|
| 41 | CrTi | CoCrPt(150) | Cr | CoNiZr(126) | Cr | CoCrTa(160) | C | 30 |
| 42 | Cr | CoNiPt(150) | Cr | CoNiCr(176) | Cr | CoCrPt(188) | C | 29 |

TABLE 17

R/W CHARACTERISTICS OF MAGNETIC RECORDING MEDIA ACCORDING TO THE PRESENT INVENTION

| | | 13, 13' (Å) | 14, 14' (Å) | 18, 18' (Å) | 19, 19' (Å) | 15, 15' | S/N [dB] |
|---|---|---|---|---|---|---|---|
| EXAMPLE NO 4 | 43 | — | CoCrTa(150) | Cr(100) | CoCrPt(141) | C | 26 |
| | 44 | Cr(10) | CoCrTa(150) | Cr(100) | CoCrPt(141) | C | 30 |
| | 45 | Cr(500) | CoCrTa(150) | Cr(100) | CoCrPt(141) | C | 30 |
| | 46 | Cr(1000) | CoCrTa(150) | Cr(100) | CoCrPt(141) | C | 29 |
| | 47 | Cr(2500) | CoCrTa(150) | Cr(100) | CoCrPt(141) | C | 29 |
| | 48 | Cr(5000) | CoCrTa(150) | Cr(100) | CoCrPt(141) | C | 28 |
| | 49 | Cr(6000) | CoCrTa(150) | Cr(100) | CoCrPt(141) | C | 25 |
| | 50 | Cr(500) | CoCrTa(150) | — | CoCrPt(141) | C | 24 |
| | 51 | Cr(500) | CoCrTa(150) | Cr(5) | CoCrPt(141) | C | 27 |
| | 52 | Cr(500) | CoCrTa(150) | Cr(20) | CoCrPt(141) | C | 29 |
| | 53 | Cr(500) | CoCrTa(150) | Cr(50) | CoCrPt(141) | C | 30 |
| | 54 | Cr(500) | CoCrTa(150) | Cr(100) | CoCrPt(141) | C | 30 |
| | 55 | Cr(500) | CoCrTa(150) | Cr(200) | CoCrPt(141) | C | 30 |
| | 56 | Cr(500) | CoCrTa(150) | Cr(300) | CoCrPt(141) | C | 29 |

TABLE 18

R/W CHARACTERISTICS OF MAGNETIC RECORDING MEDIA ACCORDING TO THE PRESENT INVENTION

| | | 13, 13' | 14, 14' (Å) | 18 18' | 19, 19' (Å) | 15 15' | S/N [dB] | $D_{50}$[kFCl] |
|---|---|---|---|---|---|---|---|---|
| EXAMPLE NO 5 | 1 | Cr | CoCrTa(150) | CrTi | CoCrPt(141) | C | 35 | 71.0 |
| | 2 | Cr | CoCrTa(150) | CrSi | CoNiCr(132) | C | 31 | 69.5 |
| | 3 | Cr | CoCrPt(150) | Cr | CoNiZr(126) | C | 33 | 68.0 |
| | 4 | CrFe | CoCrTa(150) | CrTi | CoCrPt(141) | C | 34 | 67.7 |
| | 5 | CrV | CoCrTa(150) | CrNb | CoCrPt(141) | C | 35 | 69.5 |
| | 6 | CrCu | CoCrPt(150) | CrRh | CoCrTa(160) | C | 36 | 71.2 |
| | 7 | CrTi | CoCrPt(150) | Cr | CoCrTa(160) | C | 37 | 72.5 |
| | 8 | CrTi | CoCrPt(150) | CrSi | CoNiZr(126) | C | 33 | 69.5 |
| | 9 | CrTi | CoCrPt(150) | CrPt | CoCrTa(160) | C | 35 | 67.7 |
| | 10 | CrTi | CoCrPt(150) | W | CoCrTa(160) | C | 32 | 69.9 |
| | 11 | CrTi | CoCrPt(150) | CrGe | CoCrTa(160) | C | 34 | 72.3 |
| | 12 | CrTi | CoCrTa(150) | CrTi | CoCrPt(141) | C | 34 | 73.2 |

It is shown that the read/write characteristics measured by using a MR-type magnetic reading head are notably improved because of the high read output obtained. Particularly, medium noise is remarkably reduced in the case that the remanence $B_r$ for the separated magnetic head near to the magnetic head is lower than the $B_r$ for the substrate side magnetic film, resulting in a higher S/N ratio.

Throughout this description, specific materials have been advanced as being suitable for inclusion in one or more embodiments of the invention. Where an embodiment is described without specific reference to suitable materials, the knowledge of the person of ordinary skill in the art is to be imputed along with the teachings contained elsewhere in the description.

Furthermore, various separate embodiments of the invention have been described, using distinct and specific examples. However, each feature of the various embodiments that is not mutually exclusive with another embodiment may be incorporated into such an embodiment.

For example, the combined circumferential and radial texturing described above may be incorporated with any of the substrates described with respect to any of the other embodiments. Similarly, the crystal orientation control layer 17, where useful, can be incorporated into any of the embodiments.

Finally, a magnetic recording system incorporating any of the various inventive magnetic recording media fall within the scope of the invention, including specifically-described media and those that are not specifically recounted, but incorporate various features described throughout the Specification.

Various other modifications will become apparent to one skilled in the art. All such modifications that basically rely upon the teachings through which the present invention has advanced the state of the art are properly considered within the spirit and scope of the invention.

We claim:

1. A thin-film magnetic recording medium, comprising:
   a substrate;

an underlayer on said substrate;

a first magnetic layer on said underlayer;

a first nonmagnetic intermediate layer on said first magnetic layer; and a second magnetic layer on said first nonmagnetic intermediate layer;

wherein the residual magnetic flux density $B_r$ and thickness $\delta$ are each different for each magnetic layer; and wherein the dot product $B_r \cdot \delta$ is the same for each magnetic layer.

2. A thin-film magnetic recording medium as claimed in claim 1, further comprising a second nonmagnetic intermediate layer on said second magnetic layer; and a third magnetic layer on said second nonmagnetic intermediate layer.

3. A thin-film magnetic recording medium as claimed in claim 1, wherein the underlayer has crystal grains whose (110) crystal lattice plane is parallel to the substrate surface and crystal grains whose (100) crystal lattice plane is parallel to the substrate surface, arranged in a mixed manner in said underlayer.

4. A thin-film magnetic recording disk as claimed in claim 1, wherein said substrate has a texture with circumferential and radial components; and wherein said texture has a circumferential texture angle, viewed from above looking down on the substrate surface, of less than approximately ±45° between the texture and a straight line that is perpendicular to a radial straight line connecting a point of the texture and the center of the disk, and a radial texture angle of less than approximately ±45° between the texture and the radial straight line.

5. A thin-film magnetic recording medium as claimed in claim 1, wherein a ratio L/P of the number of substantially in-plane crystal grains L in one of the magnetic layers to the number of substantially perpendicular crystal grains P in said one of the magnetic layers is greater than about 1/1 and less than about 20/1.

6. A thin-film magnetic recording medium as claimed in claim 1, wherein an easy access of magnetization of the thin-film magnetic recording medium is substantially parallel with a plane of the substrate.

7. A thin-film magnetic recording medium as claimed in claim 3, further comprising a crystal orientation control layer between said substrate and said underlayer, for controlling crystal grain orientation of the underlayer.

8. A thin-film magnetic recording medium as claimed in claim 4, wherein an easy access of magnetization of the thin-film magnetic recording medium is substantially parallel with a plane of the substrate.

9. A thin-film magnetic recording medium as claimed in claim 4, wherein the texture has an average roughness factor $R_a$ within a range of 0.5 nm to 10 nm.

10. A thin-film magnetic recording medium as claimed in claim 9, wherein an easy access of magnetization of the thin-film magnetic recording medium is substantially parallel with a plane of the substrate.

11. A thin-film magnetic recording medium as claimed in claim 5, wherein said underlayer overlays less than the entire surface of the substrate so that a portion of the substrate surface is exposed and a portion of the substrate surface is unexposed.

12. A thin-film magnetic recording medium as claimed in claim 5, wherein the underlayer comprises first and second materials respectively including first and second crystal grains, wherein the first crystal grains are separated from each other so that the second crystal grains are located between adjacent first crystal grains; and wherein the second crystal grains are segregated at grain boundaries of the first crystal grains.

13. A thin-film magnetic recording medium as claimed in claim 5, further comprising a crystal orientation control layer, between said underlayer and said substrate, for orienting the substantially in-plane crystal grains and the substantially perpendicular crystal grains of the first magnetic layer.

14. A thin-film magnetic recording medium as claimed in claim 11, wherein the exposed portion of the substrate surface is 1% to 30% of the unexposed portion of the substrate surface.

15. A thin-film magnetic recording medium as claimed in claim 13, wherein the underlayer overlays less than the entire surface of the crystal orientation control layer so that a portion of the crystal orientation control layer surface is exposed and a portion of the crystal orientation control layer surface is unexposed.

16. A method for producing a thin-film magnetic recording medium, comprising the steps of:

providing a substrate;

providing an underlayer on said substrate;

providing a first magnetic layer on said underlayer;

providing a first nonmagnetic intermediate layer on said first magnetic layer; and providing a second magnetic layer on said first nonmagnetic intermediate layer;

wherein the residual magnetic flux density $B_r$ and thickness $\delta$ are each different for each magnetic layer; and wherein the magnetic layer-providing steps are performed so that the product $B_r \cdot \delta$ is the same for each magnetic layer.

17. A method for producing a thin-film magnetic recording medium as claimed in claim 16, further comprising the steps of:

providing a second nonmagnetic intermediate layer on said second magnetic layer; and providing a third magnetic layer on said second nonmagnetic intermediate layer.

18. A thin-film magnetic recording medium as claimed in claim 16, wherein an easy access of magnetization of the thin-film magnetic recording medium is substantially parallel with a plane of the substrate.

19. A thin-film magnetic recording disk as claimed in claim 16, wherein said substrate has a texture with circumferential and radial components; and wherein said texture has a circumferential texture angle, viewed from above looking down on the substrate surface, of less than approximately ±45° between the texture and a straight line that is perpendicular to a radial straight line connecting a point of the texture and the center of the disk, and a radial texture angle of less than approximately ±45° between the texture and the radial straight line.

20. A thin-film magnetic recording disk as claimed in claim 18, wherein said substrate has a texture with circumferential and radial components; and wherein said texture has a circumferential texture angle, viewed from above looking down on the substrate surface, of less than approximately ±45° between the texture and a straight line that is perpendicular to a radial straight line connecting a point of the texture and the center of the disk, and a radial texture angle of less than approximately ±45° between the texture and the radial straight line.

21. A thin-film magnetic recording medium as claimed in claim 19, wherein the texture has an average roughness factor $R_a$ within a range of 0.5 nm to 10 nm.

22. A thin-film magnetic recording medium as claimed in claim 21, wherein an easy access of magnetization of the thin-film magnetic recording medium is substantially parallel with a plane of the substrate.

23. In a recording/reproduction system including a magnetic recording medium drive unit, a magnetic head, a magnetic head drive unit, a thin-film magnetic recording medium, and a read/write signal processing system for processing signals read to and written from the magnetic recording medium, the improvement wherein said thin-film magnetic recording medium comprises:

a substrate;

an underlayer on said substrate;

a first magnetic layer on said underlayer;

a first nonmagnetic intermediate layer on said first magnetic layer; and a second magnetic layer on said first nonmagnetic intermediate layer;

wherein the residual magnetic flux density $B_r$ and thickness $\delta$ are each different for each magnetic layer, and the dot product $B_r \cdot \delta$ is the same for each magnetic layer.

24. A thin-film magnetic recording medium as claimed in claim 23, wherein an easy access of magnetization of the thin-film magnetic recording medium is substantially parallel with a plane of the substrate.

25. A thin-film magnetic recording disk as claimed in claim 23, wherein said substrate has a texture with circumferential and radial components; and wherein said texture has a circumferential texture angle, viewed from above looking down on the substrate surface, of less than approximately ±45° between the texture and a straight line that is perpendicular to a radial straight line connecting a point of the texture and the center of the disk, and a radial texture angle of less than approximately ±45° between the texture and the radial straight line.

26. A thin-film magnetic recording disk as claimed in claim 24, wherein said substrate has a texture with circumferential and radial components; and wherein said texture has a circumferential texture angle, viewed from above looking down on the substrate surface, of less than approximately ±45° between the texture and a straight line that is perpendicular to a radial straight line connecting a point of the texture and the center of the disk, and a radial texture angle of less than approximately ±45° between the texture and the radial straight line.

27. A thin-film magnetic recording medium as claimed in claim 25, wherein the texture has an average roughness factor $R_a$ within a range of 0.5 nm to 10 nm.

28. A thin-film magnetic recording medium as claimed in claim 27, wherein an easy access of magnetization of the thin-film magnetic recording medium is substantially parallel with a plane of the substrate.

* * * * *

UNITED STATES PATENT AND TRADEMARK OFFICE
CERTIFICATE OF CORRECTION

PATENT NO. : 5,605,733
DATED : February 25, 1997
INVENTOR(S) : A. ISHIKAWA et al It is certified that error appears in the above-indentified patent and that said Letters Patent is hereby corrected as shown below:

IN THE CLAIMS

Column 37, claim 4, line 23, change "disk" to --medium--,
    line 24, delete the line in its entirety and replace with --1;
    wherein the thin-film magnetic recording medium is a disk;
    wherein said substrate has a texture with circumferential--.

Column 38, claim 18, line 44, after "A" insert --method for producing a--.

Claim 19, line 48, after "A" insert --method for producing a-- and change "disk" to --medium--;
    line 49, delete the line in its entirety and replace with --claim 16,
    wherein said thin-film magnetic recording medium is a disk;
    wherein said substrate has a texture with circum- --.

Claim 20, line 59, after "A" insert --method for producing a-- and change "disk" to --medium--;
    line 60, delete the line in its entirety and replace with --claim 18,
    wherein said thin-film magnetic recording medium is a disk;
    wherein said substrate has a texture with circum- --.

Column 39, claim 21, line 3, after "A" insert --method for producing a--.

Claim 22, line 6, after "A" insert --method for producing a--.

Claim 24, line 29, change "thin-film magnetic recording medium" to --recording/reproduction system--.

UNITED STATES PATENT AND TRADEMARK OFFICE
CERTIFICATE OF CORRECTION

PATENT NO. : 5,605,733
DATED : February 25, 1997
INVENTOR(S) : A. ISHIKAWA et al It is certified that error appears in the above-indentified patent and that said Letters Patent is hereby corrected as shown below:

Column 40, claim 25, line 1, change "thin-film magnetic recording disk" to --recording/reproduction system--;
    line 2, delete the line in its entirety and replace with --claim 23,
  wherein said thin-film magnetic recording medium is a disk;
  wherein said substrate has a texture with circum- --.

Claim 26, line 13, change "thin-film magnetic recording disk" to --recording/reproduction system--;
    line 14, delete the line in its entirety and replace with --claim 24,
  wherein said thin-film magnetic recording medium is a disk;
  wherein said substrate has a texture with circum- --.

Claim 27, line 24, change "thin-film magnetic recording medium" to --recording/reproduction system--.

Claim 28, line 27, change "thin-film magnetic recording medium" to --recording/reproduction system--.

Signed and Sealed this

Third Day of March, 1998

Attest:

BRUCE LEHMAN

*Attesting Officer*       *Commissioner of Patents and Trademarks*